United States Patent

Proebsting

[15] 3,643,254

[45] Feb. 15, 1972

[54] KEYBOARD ENCODER SYSTEM

[72] Inventor: Robert J. Proebsting, Dallas, Tex.

[73] Assignee: Texas Instruments Incorporated, Dallas, Tex.

[22] Filed: Mar. 18, 1970

[21] Appl. No.: 20,686

[52] U.S. Cl. ....................340/347 DD, 35/6, 178/26 R, 340/365, 178/17 C

[51] Int. Cl. ....................H04l 17/00, H03k 13/24

[58] Field of Search ....................340/347 DD, 365, 172.5; 235/154, 155; 178/17 R, 17 A, 17 C; 197/19, 20; 35/6

[56] References Cited

UNITED STATES PATENTS

| | | | |
|---|---|---|---|
| 3,526,892 | 9/1970 | Bartlett et al. | 340/365 |
| 3,122,734 | 2/1964 | Rice | 340/347 DD |
| 3,308,236 | 3/1967 | Jones | 178/26 R X |
| 3,493,928 | 2/1970 | Juliusburger | 340/347 DD X |
| 3,530,239 | 9/1970 | Corell et al. | 340/365 X |
| 2,869,703 | 1/1959 | Hebel | 178/17 C X |

OTHER PUBLICATIONS

L. Lankford, "Keyboard Circuit," Nov. 1966, *IBM Tech. Dis. Bull.*, Vol. 9, No. 6, pp. 586–587; copy in class 340, Sub. 365

*Primary Examiner*—Thomas A. Robinson
*Attorney*—Samuel M. Mims, Jr., James O. Dixon, Andrew M. Hassell, Harold Levine, Melvin Sharp, Michael A. Sileo, Jr., Henry T. Olsen, John E. Vandigriff and Gary C. Honeycutt

[57] ABSTRACT

An encoder system provides inexpensive means for reducing the number of output connections from a keyboard, wherein each character key provides only two output signals. Each of the output signals from a character key is connected to only one of the inputs of the encoder system for the transmission of information thereto, and two or more additional outputs from shift keys are transmitted to separate shift inputs of the encoder representing, for example, alphabetical and numeric characters, respectively. One depression of any two character keys causes a digital default signal and the encoder treats the condition as if no keys were depressed. The output from the encoder is a binary signal which is transmitted to other peripheral equipment such as the central processor or memory buffer of a computer system.

31 Claims, 17 Drawing Figures

INVENTOR
ROBERT J. PROEBSTING

PATENTED FEB 15 1972 3,643,254

SHEET 03 OF 15

| KEY | $K_1$ | $K_2$ | $K_3$ | $K_4$ | $K_5$ | $K_6$ | $K_7$ | $K_8$ | $K_9$ | $K_{10}$ | $K_{11}$ | $K_{12}$ | $K_{13}$ |
|---|---|---|---|---|---|---|---|---|---|---|---|---|---|
| 1 | X | X | | | | | | | | | | | |
| 2 | X | | X | | | | | | | | | | |
| 3 | X | | | X | | | | | | | | | |
| 4 | X | | | | X | | | | | | | | |
| 5 | X | | | | | X | | | | | | | |
| 6 | X | | | | | | X | | | | | | |
| 7 | X | | | | | | | X | | | | | |
| 8 | X | | | | | | | | X | | | | |
| 9 | X | | | | | | | | | X | | | |
| 10 | X | | | | | | | | | | X | | |
| 11 | X | | | | | | | | | | | X | |
| 12 | X | | | | | | | | | | | | X |
| 13 | | X | X | | | | | | | | | | |
| 14 | | X | | X | | | | | | | | | |
| 15 | | X | | | X | | | | | | | | |
| 16 | | X | | | | X | | | | | | | |
| 17 | | X | | | | | X | | | | | | |
| 18 | | X | | | | | | X | | | | | |
| 19 | | X | | | | | | | X | | | | |
| 20 | | X | | | | | | | | X | | | |
| 21 | | X | | | | | | | | | X | | |
| 22 | | X | | | | | | | | | | X | |
| 23 | | X | | | | | | | | | | | X |
| 24 | | | X | X | | | | | | | | | |
| 25 | | | X | | X | | | | | | | | |
| 26 | | | X | | | X | | | | | | | |
| 27 | | | X | | | | X | | | | | | |
| 28 | | | X | | | | | X | | | | | |
| 29 | | | X | | | | | | X | | | | |
| 30 | | | X | | | | | | | X | | | |
| 31 | | | X | | | | | | | | X | | |
| 32 | | | X | | | | | | | | | X | |
| 33 | | | X | | | | | | | | | | X |
| 34 | | | | X | X | | | | | | | | |
| 35 | | | | X | | X | | | | | | | |
| 36 | | | | X | | | X | | | | | | |
| 37 | | | | X | | | | X | | | | | |
| 38 | | | | X | | | | | X | | | | |
| 39 | | | | X | | | | | | X | | | |

| KEY | $K_1$ | $K_2$ | $K_3$ | $K_4$ | $K_5$ | $K_6$ | $K_7$ | $K_8$ | $K_9$ | $K_{10}$ | $K_{11}$ | $K_{12}$ | $K_{13}$ |
|---|---|---|---|---|---|---|---|---|---|---|---|---|---|
| 40 | | | | X | | | | | | | X | | |
| 41 | | | | X | | | | | | | | X | |
| 42 | | | | X | | | | | | | | | X |
| 43 | | | | | X | X | | | | | | | |
| 44 | | | | | X | | X | | | | | | |
| 45 | | | | | X | | | X | | | | | |
| 46 | | | | | X | | | | X | | | | |
| 47 | | | | | X | | | | | X | | | |
| 48 | | | | | X | | | | | | X | | |
| 49 | | | | | X | | | | | | | X | |
| 50 | | | | | X | | | | | | | | X |
| 51 | | | | | X | | | | | | | | |
| 52 | | | | | | X | X | | | | | | |
| 53 | | | | | | X | | X | | | | | |
| 54 | | | | | | X | | | X | | | | |
| 55 | | | | | | X | | | | X | | | |
| 56 | | | | | | X | | | | | X | | |
| 57 | | | | | | X | | | | | | X | |
| 58 | | | | | | | X | X | | | | | X |
| 59 | | | | | | | X | | X | | | | |
| 60 | | | | | | | X | | | X | | | |
| 61 | | | | | | | X | | | | X | | |
| 62 | | | | | | | X | | | | | X | |
| 63 | | | | | | | X | | | | | | X |
| 64 | | | | | | | | X | X | | | | |
| 65 | | | | | | | | X | | X | | | |
| 66 | | | | | | | | X | | | X | | |
| 67 | | | | | | | | X | | | | X | |
| 68 | | | | | | | | X | | | | | X |
| 69 | | | | | | | | | X | X | | | |
| 70 | | | | | | | | | X | | X | | |
| 71 | | | | | | | | | X | | | X | |
| 72 | | | | | | | | | X | | | | X |
| 73 | | | | | | | | | | X | X | | |
| 74 | | | | | | | | | | X | | X | |
| 75 | | | | | | | | | | X | | | X |
| 76 | | | | | | | | | | | X | X | |
| 77 | | | | | | | | | | | X | | X |
| 78 | | | | | | | | | | | | X | X |

*Fig. 3*

| AND ↓ | $I_1$ | $\bar{I}_1$ | $I_2$ | $\bar{I}_2$ | $I_3$ | $\bar{I}_3$ | $I_4$ | $\bar{I}_4$ | $I_5$ | $\bar{I}_5$ | $I_6$ | $\bar{I}_6$ | $I_7$ | $\bar{I}_7$ | $I_8$ | $\bar{I}_8$ | $I_9$ | $\bar{I}_9$ | $I_{10}$ | $\bar{I}_{10}$ | $I_{11}$ | $\bar{I}_{11}$ | $I_{12}$ | $\bar{I}_{12}$ | $I_{13}$ | $\bar{I}_{13}$ |
|---|---|---|---|---|---|---|---|---|---|---|---|---|---|---|---|---|---|---|---|---|---|---|---|---|---|---|
| 1 | X | | X | | | X | | X | | X | | X | | X | | X | | X | | X | | X | | X | | X |
| 2 | X | | | X | X | | | X | | X | | X | | X | | X | | X | | X | | X | | X | | X |
| 3 | X | | | X | | X | X | | | X | | X | | X | | X | | X | | X | | X | | X | | X |
| 4 | X | | | X | | X | | X | X | | | X | | X | | X | | X | | X | | X | | X | | X |
| 5 | X | | | X | | X | | X | | X | X | | | X | | X | | X | | X | | X | | X | | X |
| 6 | X | | | X | | X | | X | | X | | X | X | | | X | | X | | X | | X | | X | | X |
| 7 | X | | | X | | X | | X | | X | | X | | X | X | | | X | | X | | X | | X | | X |
| 8 | X | | | X | | X | | X | | X | | X | | X | | X | X | | | X | | X | | X | | X |
| 9 | X | | | X | | X | | X | | X | | X | | X | | X | | X | X | | | X | | X | | X |
| 10 | X | | | X | | X | | X | | X | | X | | X | | X | | X | | X | X | | | X | | X |
| 11 | X | | | X | | X | | X | | X | | X | | X | | X | | X | | X | | X | X | | | X |
| 12 | X | | | X | | X | | X | | X | | X | | X | | X | | X | | X | | X | | X | X | |
| 13 | | X | X | | X | | | X | | X | | X | | X | | X | | X | | X | | X | | X | | X |
| 14 | | X | X | | | X | X | | | X | | X | | X | | X | | X | | X | | X | | X | | X |
| 15 | | X | X | | | X | | X | X | | | X | | X | | X | | X | | X | | X | | X | | X |
| 16 | | X | X | | | X | | X | | X | X | | | X | | X | | X | | X | | X | | X | | X |
| 17 | | X | X | | | X | | X | | X | | X | X | | | X | | X | | X | | X | | X | | X |
| 18 | | X | X | | | X | | X | | X | | X | | X | X | | | X | | X | | X | | X | | X |
| 19 | | X | X | | | X | | X | | X | | X | | X | | X | X | | | X | | X | | X | | X |
| 20 | | X | X | | | X | | X | | X | | X | | X | | X | | X | X | | | X | | X | | X |
| 21 | | X | X | | | X | | X | | X | | X | | X | | X | | X | | X | X | | | X | | X |
| 22 | | X | X | | | X | | X | | X | | X | | X | | X | | X | | X | | X | X | | | X |
| 23 | | X | X | | | X | | X | | X | | X | | X | | X | | X | | X | | X | | X | X | |
| 24 | | X | | X | X | | X | | | X | | X | | X | | X | | X | | X | | X | | X | | X |
| 25 | | X | | X | X | | | X | X | | | X | | X | | X | | X | | X | | X | | X | | X |
| 26 | | X | | X | X | | | X | | X | X | | | X | | X | | X | | X | | X | | X | | X |
| 27 | | X | | X | X | | | X | | X | | X | X | | | X | | X | | X | | X | | X | | X |
| 28 | | X | | X | X | | | X | | X | | X | | X | X | | | X | | X | | X | | X | | X |
| 29 | | X | | X | X | | | X | | X | | X | | X | | X | X | | | X | | X | | X | | X |
| 30 | | X | | X | X | | | X | | X | | X | | X | | X | | X | X | | | X | | X | | X |
| 31 | | X | | X | X | | | X | | X | | X | | X | | X | | X | | X | X | | | X | | X |
| 32 | | X | | X | X | | | X | | X | | X | | X | | X | | X | | X | | X | X | | | X |
| 33 | | X | | X | X | | | X | | X | | X | | X | | X | | X | | X | | / | | X | X | |
| 34 | | X | | X | | X | X | | X | | | X | | X | | X | | X | | X | | X | | X | | X |
| 35 | | X | | X | | X | X | | | X | X | | | X | | X | | X | | X | | X | | X | | X |
| 36 | | X | | X | | X | X | | | X | | X | X | | | X | | X | | X | | X | | X | | X |
| 37 | | X | | X | | X | X | | | X | | X | | X | X | | | X | | X | | X | | X | | X |
| 38 | | X | | X | | X | X | | | X | | X | | X | | X | X | | | X | | X | | X | | X |
| 39 | | X | | X | | X | X | | | X | | X | | X | | X | | X | X | | | X | | X | | X |
| 40 | | X | | X | | X | X | | | X | | X | | X | | X | | X | | X | X | | | X | | X |

Fig. 4

| AND | $I_1$ | $\bar{I}_1$ | $I_2$ | $\bar{I}_2$ | $I_3$ | $\bar{I}_3$ | $I_4$ | $\bar{I}_4$ | $I_5$ | $\bar{I}_5$ | $I_6$ | $\bar{I}_6$ | $I_7$ | $\bar{I}_7$ | $I_8$ | $\bar{I}_8$ | $I_9$ | $\bar{I}_9$ | $I_{10}$ | $\bar{I}_{10}$ | $I_{11}$ | $\bar{I}_{11}$ | $I_{12}$ | $\bar{I}_{12}$ | $I_{13}$ | $\bar{I}_{13}$ |
|---|---|---|---|---|---|---|---|---|---|---|---|---|---|---|---|---|---|---|---|---|---|---|---|---|---|---|
| 41 | | X | | X | | X | X | | | X | | X | | X | | X | | X | | X | | X | X | | | X |
| 42 | | X | | X | | X | X | | | X | | X | | X | | X | | X | | X | | X | | X | X | |
| 43 | | X | | X | | X | | X | X | | X | | | X | | X | | X | | X | | X | | X | | X |
| 44 | | X | | X | | X | | X | X | | | X | X | | | | | X | | X | | X | | X | | X |
| 45 | | X | | X | | X | | X | X | | | X | | X | X | | | X | | X | | X | | X | | X |
| 46 | | X | | X | | X | | X | X | | | X | | X | | X | X | | | X | | X | | X | | X |
| 47 | | X | | X | | X | | X | X | | | X | | X | | X | | X | X | | | X | | X | | X |
| 48 | | X | | X | | X | | X | X | | | X | | X | | X | | X | | X | X | | | X | | X |
| 49 | | X | | X | | X | | X | X | | | X | | X | | X | | X | | X | | X | X | | | X |
| 50 | | X | | X | | X | | X | X | | | X | | X | | X | | X | | X | | X | | X | X | |
| 51 | | X | | X | | X | | X | | X | X | | X | | | X | | X | | X | | X | | X | | X |
| 52 | | X | | X | | X | | X | | X | X | | | X | X | | | X | | X | | X | | X | | X |
| 53 | | X | | X | | X | | X | | X | X | | | X | | X | X | | | X | | X | | X | | X |
| 54 | | X | | X | | X | | X | | X | X | | | X | | X | | X | X | | | X | | X | | X |
| 55 | | X | | X | | X | | X | | X | X | | | X | | X | | X | | X | X | | | X | | X |
| 56 | | X | | X | | X | | X | | X | X | | | X | | X | | X | | X | | X | X | | | X |
| 57 | | X | | X | | X | | X | | X | X | | | X | | X | | X | | X | | X | | X | X | |
| 58 | | X | | X | | X | | X | | X | | X | X | | X | | | X | | X | | X | | X | | X |
| 59 | | X | | X | | X | | X | | X | | X | X | | | X | X | | | X | | X | | X | | X |
| 60 | | X | | X | | X | | X | | X | | X | X | | | X | | X | X | | | X | | X | | X |
| 61 | | X | | X | | X | | X | | X | | X | X | | | X | | X | | X | X | | | X | | X |
| 62 | | X | | X | | X | | X | | X | | X | X | | | X | | X | | X | | X | X | | | X |
| 63 | | X | | X | | X | | X | | X | | X | X | | | X | | X | | X | | X | | X | X | |
| 64 | | X | | X | | X | | X | | X | | X | | X | X | | X | | | X | | X | | X | | X |
| 65 | | X | | X | | X | | X | | X | | X | | X | X | | | X | X | | | X | | X | | X |
| 66 | | X | | X | | X | | X | | X | | X | | X | X | | | X | | X | X | | | X | | X |
| 67 | | X | | X | | X | | X | | X | | X | | X | X | | | X | | X | | X | X | | | X |
| 68 | | X | | X | | X | | X | | X | | X | | X | X | | | X | | X | | X | | X | X | |
| 69 | | X | | X | | X | | X | | X | | X | | X | | X | X | | X | | | X | | X | | X |
| 70 | | X | | X | | X | | X | | X | | X | | X | | X | X | | | X | X | | | X | | X |
| 71 | | X | | X | | X | | X | | X | | X | | X | | X | X | | | X | | X | X | | | X |
| 72 | | X | | X | | X | | X | | X | | X | | X | | X | X | | | X | | X | | X | X | |
| 73 | | X | | X | | X | | X | | X | | X | | X | | X | | X | X | | X | | | X | | X |
| 74 | | X | | X | | X | | X | | X | | X | | X | | X | | X | X | | | X | X | | | X |
| 75 | | X | | X | | X | | X | | X | | X | | X | | X | | X | X | | | X | | X | X | |
| 76 | | X | | X | | X | | X | | X | | X | | X | | X | | X | | X | X | | X | | | X |
| 77 | | X | | X | | X | | X | | X | | X | | X | | X | | X | | X | X | | | X | X | |
| 78 | | X | | X | | X | | X | | X | | X | | X | | X | | X | | X | | X | X | | X | |
| 79 | X | | X | | X | | X | | X | | X | | X | | X | | X | | X | | X | | X | | X | |
| 80 | | X | | X | | X | | X | | X | | X | | X | | X | | X | | X | | X | | X | | X |

Fig. 5

OR →

AND ↓

| | 1 | 2 | 3 | 4 | 5 | 6 | 7 | 8 | 9 | 10 |
|---|---|---|---|---|---|---|---|---|---|---|
| 1 | X | | X | | | X | | | | |
| 2 | X | | X | | | | | | | X |
| 3 | X | | X | | | X | | | | X |
| 4 | X | | X | | | | | | | |
| 5 | X | | X | | | X | | | | |
| 6 | X | | X | | | | | | | X |
| 7 | X | | X | | | X | | | | X |
| 8 | X | | X | | | | | | | |
| 9 | X | | X | | | X | | | | |
| 10 | X | | X | | | | | | | X |
| 11 | X | | X | | | X | | | | X |
| 12 | X | | X | | | | | | | |
| 13 | X | | X | | | X | | | | |
| 14 | X | | X | | | | | | | X |
| 15 | X | | X | | | X | | | | X |
| 16 | X | | X | | | | | | | |
| 17 | X | | X | | | X | | | | |
| 18 | X | | X | | | | | | | X |
| 19 | X | | X | | | X | | | | X |
| 20 | X | | X | | | | | | | |
| 21 | X | | X | | | X | | | | |
| 22 | X | | X | | | | | | | X |
| 23 | X | | X | | | X | | | | X |
| 24 | X | | X | | | | | | | |
| 25 | X | | X | | | X | | | | |
| 26 | X | | X | | | | | | | X |
| 27 | X | | X | | | X | | | | X |
| 28 | X | | X | | | | | | | |
| 29 | X | | X | | | X | | | | |
| 30 | X | | X | | | | | | | X |
| 31 | X | | X | | | X | | | | X |
| 32 | X | | X | | | | | | | |
| 33 | X | | X | | | X | | | | |
| 34 | X | | X | | | | | | | X |
| 35 | X | | X | | | X | | | | X |
| 36 | X | | X | | | | | | | |
| 37 | X | | X | | | X | | | | |
| 38 | X | | X | | | | | | | X |
| 39 | X | | X | | | X | | | | X |

| | 1 | 2 | 3 | 4 | 5 | 6 | 7 | 8 | 9 | 10 |
|---|---|---|---|---|---|---|---|---|---|---|
| 40 | X | | X | | | | | | | |
| 41 | X | | X | | | X | X | | | |
| 42 | X | | X | | | | | | | X |
| 43 | X | | X | | | X | X | | | X |
| 44 | X | | X | | | | | | | |
| 45 | X | | X | | | X | X | | | |
| 46 | X | | X | | | | | | | X |
| 47 | X | | X | | | X | X | | | X |
| 48 | X | | / | | | | | | | |
| 49 | X | | X | | X | X | X | X | X | X |
| 50 | X | | X | | | | | | | |
| 51 | X | | X | | | | | X | | |
| 52 | X | | X | | | | | | | |
| 53 | X | | X | | | | | X | | |
| 54 | X | | X | | | | | | | |
| 55 | X | | X | | | | | X | | |
| 56 | X | | X | | | | | | | |
| 57 | X | | X | | | | | X | | |
| 58 | X | | X | | | | | | | |
| 59 | X | | X | | | | | X | | |
| 60 | X | | X | | X | | | | X | |
| 61 | X | | X | | X | | | | | |
| 62 | X | | X | | X | | | | | |
| 63 | X | | X | | X | | | | | |
| 64 | X | | X | | X | | | | | |
| 65 | X | | X | | | | | | X | |
| 66 | X | | X | | | | | | X | |
| 67 | X | | X | | | | | | X | |
| 68 | X | | X | | | | | | X | |
| 69 | X | | X | | | | | | | |
| 70 | X | | X | | | | | | | |
| 71 | X | | X | | | | | | | |
| 72 | X | | X | | | | | | | |
| 73 | X | | X | | | | | | | |
| 74 | X | | X | | | | | | | |
| 75 | X | | X | | | | | | | |
| 76 | X | | X | | | | | | | |
| 77 | X | | X | | | | | | | |
| 78 | X | | X | | | | | | | |

Fig. 6

OR →

AND ↓

| | 11 | 12 | 13 | 14 | 15 | 16 | 17 | 18 | 19 | 20 |
|---|---|---|---|---|---|---|---|---|---|---|
| 1 | | | | | | | | | | |
| 2 | X | | | | | | | | | |
| 3 | X | | | | | | | | | |
| 4 | | | | X | X | | | | | |
| 5 | | | | X | X | | | | | |
| 6 | X | | | X | X | | | | | |
| 7 | X | | | X | X | | | | | |
| 8 | | | | | | | | X | X | |
| 9 | | | | | | | | X | X | |
| 10 | X | | | | | | | X | X | |
| 11 | X | | | | | | | X | X | |
| 12 | | | | X | X | | | X | X | |
| 13 | | | | X | X | | | X | X | |
| 14 | X | | | X | X | | | X | X | |
| 15 | X | | | X | X | | | X | X | |
| 16 | | | | | | | | | | |
| 17 | | | | | | | | | | |
| 18 | X | | | | | | | | | |
| 19 | X | | | | | | | | | |
| 20 | | | | X | X | | | | | |
| 21 | | | | X | X | | | | | |
| 22 | X | | | X | X | | | | | |
| 23 | X | | | X | X | | | | | |
| 24 | | | | | | | | X | X | |
| 25 | | | | | | | | X | X | |
| 26 | X | | | | | | | X | X | |
| 27 | X | | | | | | | X | X | |
| 28 | | | | X | X | | | X | X | |
| 29 | | | | X | X | | | X | X | |
| 30 | X | | | X | X | | | X | X | |
| 31 | X | | | X | X | | | X | X | |
| 32 | | | | | | | | | | |
| 33 | | | | | | | | | | |
| 34 | X | | | | | | | | | |
| 35 | X | | | | | | | | | |
| 36 | | | | X | X | | | | | |
| 37 | | | | X | X | | | | | |
| 38 | X | | | X | X | | | | | |
| 39 | X | | | X | X | | | | | |

| | 11 | 12 | 13 | 14 | 15 | 16 | 17 | 18 | 19 | 20 |
|---|---|---|---|---|---|---|---|---|---|---|
| 40 | | | | | | | | X | X | |
| 41 | | | | | | | | X | X | |
| 42 | X | | | | | | | X | X | |
| 43 | X | | | | | | | X | X | |
| 44 | | | | X | X | | | X | X | |
| 45 | | | | X | X | | | X | X | |
| 46 | X | | | X | X | | | X | X | |
| 47 | X | | | X | X | | | X | X | |
| 48 | | | | | | | | | | |
| 49 | X | X | X | X | X | X | X | X | X | X |
| 50 | | | | | | | | | | |
| 51 | | | | | | | | | | |
| 52 | | X | | | | | | | | |
| 53 | | X | | | | | | | | |
| 54 | | | | | | X | | | | |
| 55 | | | | | | X | | | | |
| 56 | | X | | | | X | | | | |
| 57 | | X | | | | X | | | | |
| 58 | | | | | | | | | | X |
| 59 | | | | | | | | | | X |
| 60 | | | | | | | | | | |
| 61 | | | X | | | | | | | |
| 62 | | | | | | | X | | | |
| 63 | | | | | | | | | | |
| 64 | | | | | | | | | | |
| 65 | | | X | | | | | | | |
| 66 | | | | | | | X | | | |
| 67 | | | | | | | | | | |
| 68 | | | | | | | | | | |
| 69 | | | X | | | | X | | | |
| 70 | | | X | | | | | | | |
| 71 | | | X | | | | | | | |
| 72 | | | | | | | X | | | |
| 73 | | | | | | | X | | | |
| 74 | | | | | | | | | | |
| 75 | | | X | | | | X | | | |
| 76 | | | | | | | | | | |
| 77 | | | | | | | | | | |
| 78 | | | | | | | | | | |

Fig. 7

OR →

AND ↓

| | 31 | 32 | 33 | 34 | 35 | 36 | 37 | 38 | 39 | 40 |
|---|---|---|---|---|---|---|---|---|---|---|
| 1 | | | X | | | | | X | X | |
| 2 | | | X | | | | | X | X | |
| 3 | | | X | | | | | X | X | |
| 4 | | | X | | | | | X | X | |
| 5 | | | X | | | | | X | X | |
| 6 | | | X | | | | | X | X | |
| 7 | | | X | | | | | X | X | |
| 8 | | | X | | | | | X | X | |
| 9 | | | X | | | | | X | X | |
| 10 | | | X | | | | | X | X | |
| 11 | | | X | | | | | X | X | |
| 12 | | | X | | | | | X | X | |
| 13 | | | X | | | | | X | X | |
| 14 | | | X | | | | | X | X | |
| 15 | | | X | | | | | X | X | |
| 16 | | | X | | | | | X | X | |
| 17 | | | X | | | | | X | X | |
| 18 | | | X | | | | | X | X | |
| 19 | | | X | | | | | X | X | |
| 20 | | | X | | | | | X | X | |
| 21 | | | X | | | | | X | X | |
| 22 | | | X | | | | | X | X | |
| 23 | | | X | | | | | X | X | |
| 24 | | | X | | | | | X | X | |
| 25 | | | X | | | | | X | X | |
| 26 | | | X | | | | | X | X | |
| 27 | | | X | | | | | X | X | |
| 28 | | | X | | | | | X | X | |
| 29 | | | X | | | | | X | X | |
| 30 | | | X | | | | | X | X | |
| 31 | | | X | | | | | X | X | |
| 32 | | | X | | | | | X | X | |
| 33 | | | X | | | | | X | X | |
| 34 | | | X | | | | | X | X | |
| 35 | | | X | | | | | X | X | |
| 36 | | | X | | | | | X | X | |
| 37 | | | X | | | | | X | X | |
| 38 | | | X | | | | | X | X | |
| 39 | | | X | | | | | X | X | |

| | 31 | 32 | 33 | 34 | 35 | 36 | 37 | 38 | 39 | 40 |
|---|---|---|---|---|---|---|---|---|---|---|
| 40 | | | X | | | | | X | X | |
| 41 | | | X | | | | | X | X | |
| 42 | | | X | | | | | X | X | |
| 43 | | | X | | | | | X | X | |
| 44 | | | X | | | | | X | X | |
| 45 | | | X | | | | | X | X | |
| 46 | | | X | | | | | X | X | |
| 47 | | | X | | | | | X | X | |
| 48 | | | X | | | | | X | X | |
| 49 | | | | | | | | X | X | |
| 50 | | | X | X | X | | | X | X | |
| 51 | | | X | X | | | | X | X | |
| 52 | | | X | X | X | | | X | X | |
| 53 | | | X | X | X | | | X | X | |
| 54 | | | X | X | X | | | X | X | |
| 55 | | | X | X | X | | | X | X | |
| 56 | | | X | X | X | | | X | X | |
| 57 | | | X | X | X | | | X | X | |
| 58 | | | X | X | X | | | X | X | |
| 59 | | | | X | X | | | X | X | |
| 60 | | | | X | X | X | | X | X | |
| 61 | | | | X | X | | | X | X | |
| 62 | | | | X | X | | | X | X | |
| 63 | | | | X | X | | | X | X | |
| 64 | | | | X | X | | | X | X | |
| 65 | | | | X | X | | | X | X | |
| 66 | | | | X | X | | | X | X | |
| 67 | | | | X | X | | | X | X | |
| 68 | | | | X | X | | | X | X | |
| 69 | | | | X | X | | | X | X | |
| 70 | | | | X | X | | | X | X | |
| 71 | | | | | X | | | X | X | |
| 72 | | | | | X | | | X | X | |
| 73 | | | | | X | | | X | X | |
| 74 | | | | | X | | | X | X | |
| 75 | | | | | X | | | X | X | |
| 76 | | | | | X | | | X | X | |
| 77 | | | | | X | | | X | X | |
| 78 | | | | X | X | | | X | X | |

*Fig. 9*

| | MODE 1 ↑ | | MODE 2 ↑ | | MODE 3 ↑ | | MODE 4 ↑ | |
|---|---|---|---|---|---|---|---|---|
| SHIFT 1 | X | X | X | X | O | O | O | O |
| SHIFT 2 | X | X | O | O | X | X | O | O |
| SHIFT 3 | X | O | X | O | X | O | X | O |

Fig. 11

MODE I

KEY

| | $O_1$ | $O_2$ | $O_3$ | $O_4$ | $O_5$ | $O_6$ | $O_7$ | $O_8$ | $O_9$ | $O_{10}$ |
|---|---|---|---|---|---|---|---|---|---|---|
| 1 | 1 | 0 | 0 | 0 | 0 | 0 | 0 | 0 | 1 | 0 |
| 2 | 1 | 0 | 0 | 0 | 0 | 0 | 0 | 0 | 1 | 0 |
| 3 | 1 | 0 | 0 | 0 | 0 | 0 | 0 | 0 | 1 | 0 |
| 4 | 1 | 0 | 0 | 0 | 0 | 0 | 0 | 0 | 1 | 0 |
| 5 | 1 | 0 | 0 | 0 | 0 | 0 | 0 | 0 | 1 | 0 |
| 6 | 1 | 0 | 0 | 0 | 0 | 0 | 0 | 0 | 1 | 0 |
| 7 | 1 | 0 | 0 | 0 | 0 | 0 | 0 | 0 | 1 | 0 |
| 8 | 1 | 0 | 0 | 0 | 0 | 0 | 0 | 0 | 1 | 0 |
| 9 | 1 | 0 | 0 | 0 | 0 | 0 | 0 | 0 | 1 | 0 |
| 10 | 1 | 0 | 0 | 0 | 0 | 0 | 0 | 0 | 1 | 0 |
| 11 | 1 | 0 | 0 | 0 | 0 | 0 | 0 | 0 | 1 | 0 |
| 12 | 1 | 0 | 0 | 0 | 0 | 0 | 0 | 0 | 1 | 0 |
| 13 | 1 | 0 | 0 | 0 | 0 | 0 | 0 | 0 | 1 | 0 |
| 14 | 1 | 0 | 0 | 0 | 0 | 0 | 0 | 0 | 1 | 0 |
| 15 | 1 | 0 | 0 | 0 | 0 | 0 | 0 | 0 | 1 | 0 |
| 16 | 1 | 0 | 0 | 0 | 0 | 0 | 0 | 0 | 1 | 0 |
| 17 | 1 | 0 | 0 | 0 | 0 | 0 | 0 | 0 | 1 | 0 |
| 18 | 1 | 0 | 0 | 0 | 0 | 0 | 0 | 0 | 1 | 0 |
| 19 | 1 | 0 | 0 | 0 | 0 | 0 | 0 | 0 | 1 | 0 |
| 20 | 1 | 0 | 0 | 0 | 0 | 0 | 0 | 0 | 1 | 0 |
| 21 | 1 | 0 | 0 | 0 | 0 | 0 | 0 | 0 | 1 | 0 |
| 22 | 1 | 0 | 0 | 0 | 0 | 0 | 0 | 0 | 1 | 0 |
| 23 | 1 | 0 | 0 | 0 | 0 | 0 | 0 | 0 | 1 | 0 |
| 24 | 1 | 0 | 0 | 0 | 0 | 0 | 0 | 0 | 1 | 0 |
| 25 | 1 | 0 | 0 | 0 | 0 | 0 | 0 | 0 | 1 | 0 |
| 26 | 1 | 0 | 0 | 0 | 0 | 0 | 0 | 0 | 1 | 0 |
| 27 | 1 | 0 | 0 | 0 | 0 | 0 | 0 | 0 | 1 | 0 |
| 28 | 1 | 0 | 0 | 0 | 0 | 0 | 0 | 0 | 1 | 0 |
| 29 | 1 | 0 | 0 | 0 | 0 | 0 | 0 | 0 | 1 | 0 |
| 30 | 1 | 0 | 0 | 0 | 0 | 0 | 0 | 0 | 1 | 0 |
| 31 | 1 | 0 | 0 | 0 | 0 | 0 | 0 | 0 | 1 | 0 |
| 32 | 1 | 0 | 0 | 0 | 0 | 0 | 0 | 0 | 1 | 0 |
| 33 | 1 | 0 | 0 | 0 | 0 | 0 | 0 | 0 | 1 | 0 |
| 34 | 1 | 0 | 0 | 0 | 0 | 0 | 0 | 0 | 1 | 0 |
| 35 | 1 | 0 | 0 | 0 | 0 | 0 | 0 | 0 | 1 | 0 |
| 36 | 1 | 0 | 0 | 0 | 0 | 0 | 0 | 0 | 1 | 0 |
| 37 | 1 | 0 | 0 | 0 | 0 | 0 | 0 | 0 | 1 | 0 |
| 38 | 1 | 0 | 0 | 0 | 0 | 0 | 0 | 0 | 1 | 0 |
| 39 | 1 | 0 | 0 | 0 | 0 | 0 | 0 | 0 | 1 | 0 |

| | $O_1$ | $O_2$ | $O_3$ | $O_4$ | $O_5$ | $O_6$ | $O_7$ | $O_8$ | $O_9$ | $O_{10}$ |
|---|---|---|---|---|---|---|---|---|---|---|
| 40 | 1 | 0 | 0 | 0 | 0 | 0 | 0 | 0 | 1 | 0 |
| 41 | 1 | 0 | 0 | 0 | 0 | 0 | 0 | 0 | 1 | 0 |
| 42 | 1 | 0 | 0 | 0 | 0 | 0 | 0 | 0 | 1 | 0 |
| 43 | 1 | 0 | 0 | 0 | 0 | 0 | 0 | 0 | 1 | 0 |
| 44 | 1 | 0 | 0 | 0 | 0 | 0 | 0 | 0 | 1 | 0 |
| 45 | 1 | 0 | 0 | 0 | 0 | 0 | 0 | 0 | 1 | 0 |
| 46 | 1 | 0 | 0 | 0 | 0 | 0 | 0 | 0 | 1 | 0 |
| 47 | 1 | 0 | 0 | 0 | 0 | 0 | 0 | 0 | 1 | 0 |
| 48 | 1 | 0 | 0 | 0 | 0 | 0 | 0 | 0 | 1 | 0 |
| 49 | 1 | 1 | 1 | 1 | 1 | 1 | 1 | 0 | 0 | 0 |
| 50 | 1 | 0 | 0 | 0 | 0 | 0 | 0 | 0 | 1 | 0 |
| 51 | 1 | 0 | 0 | 0 | 0 | 0 | 0 | 0 | 1 | 0 |
| 52 | 1 | 0 | 0 | 0 | 0 | 0 | 0 | 0 | 1 | 0 |
| 53 | 1 | 0 | 0 | 0 | 0 | 0 | 0 | 0 | 1 | 0 |
| 54 | 1 | 0 | 0 | 0 | 0 | 0 | 0 | 0 | 1 | 0 |
| 55 | 1 | 0 | 0 | 0 | 0 | 0 | 0 | 0 | 1 | 0 |
| 56 | 1 | 0 | 0 | 0 | 0 | 0 | 0 | 0 | 1 | 0 |
| 57 | 1 | 0 | 0 | 0 | 0 | 0 | 0 | 0 | 1 | 0 |
| 58 | 1 | 0 | 0 | 0 | 0 | 0 | 0 | 0 | 1 | 0 |
| 59 | 1 | 0 | 0 | 0 | 0 | 0 | 0 | 0 | 1 | 0 |
| 60 | 1 | 1 | 1 | 0 | 0 | 0 | 0 | 1 | 0 | 0 |
| 61 | 1 | 1 | 0 | 1 | 0 | 0 | 0 | 1 | 0 | 0 |
| 62 | 1 | 1 | 0 | 0 | 1 | 0 | 0 | 1 | 0 | 0 |
| 63 | 1 | 1 | 0 | 0 | 0 | 1 | 0 | 1 | 0 | 0 |
| 64 | 1 | 1 | 0 | 0 | 0 | 0 | 1 | 1 | 0 | 0 |
| 65 | 1 | 0 | 1 | 1 | 0 | 0 | 0 | 1 | 0 | 0 |
| 66 | 1 | 0 | 1 | 0 | 1 | 0 | 0 | 1 | 0 | 0 |
| 67 | 1 | 0 | 1 | 0 | 0 | 1 | 0 | 1 | 0 | 0 |
| 68 | 1 | 0 | 1 | 0 | 0 | 0 | 1 | 1 | 0 | 0 |
| 69 | 1 | 0 | 0 | 1 | 1 | 0 | 0 | 1 | 0 | 0 |
| 70 | 1 | 0 | 0 | 1 | 0 | 1 | 0 | 1 | 0 | 0 |
| 71 | 1 | 0 | 0 | 1 | 0 | 0 | 1 | 1 | 0 | 0 |
| 72 | 1 | 0 | 0 | 0 | 1 | 1 | 0 | 1 | 0 | 0 |
| 73 | 1 | 0 | 0 | 0 | 1 | 0 | 1 | 1 | 0 | 0 |
| 74 | 1 | 0 | 0 | 0 | 0 | 1 | 1 | 1 | 0 | 0 |
| 75 | 1 | 0 | 0 | 1 | 1 | 1 | 1 | 1 | 0 | 0 |
| 76 | 1 | 0 | 0 | 0 | 0 | 0 | 0 | 1 | 0 | 0 |
| 77 | 1 | 0 | 0 | 0 | 0 | 0 | 0 | 1 | 0 | 0 |
| 78 | 1 | 0 | 0 | 0 | 0 | 0 | 0 | 1 | 0 | 0 |

Fig. 12

MODE 2

KEY

| | 0 | 0 | 0 | 0 | 0 | 0 | 0 | 0 | 0 | 0 |
|---|---|---|---|---|---|---|---|---|---|---|
| | 1 | 2 | 3 | 4 | 5 | 6 | 7 | 8 | 9 | 10 |
| 1 | 0 | 1 | 0 | 0 | 0 | 0 | 0 | 0 | 0 | 1 |
| 2 | 0 | 0 | 1 | 0 | 0 | 0 | 0 | 0 | 0 | 1 |
| 3 | 0 | 1 | 1 | 0 | 0 | 0 | 0 | 0 | 0 | 1 |
| 4 | 0 | 0 | 0 | 1 | 0 | 0 | 0 | 0 | 0 | 1 |
| 5 | 0 | 1 | 0 | 1 | 0 | 0 | 0 | 0 | 0 | 1 |
| 6 | 0 | 0 | 1 | 1 | 0 | 0 | 0 | 0 | 0 | 1 |
| 7 | 0 | 1 | 1 | 1 | 0 | 0 | 0 | 0 | 0 | 1 |
| 8 | 0 | 0 | 0 | 0 | 1 | 0 | 0 | 0 | 0 | 1 |
| 9 | 0 | 1 | 0 | 0 | 1 | 0 | 0 | 0 | 0 | 1 |
| 10 | 0 | 0 | 1 | 0 | 1 | 0 | 0 | 0 | 0 | 1 |
| 11 | 0 | 1 | 1 | 0 | 1 | 0 | 0 | 0 | 0 | 1 |
| 12 | 0 | 0 | 0 | 1 | 1 | 0 | 0 | 0 | 0 | 1 |
| 13 | 0 | 1 | 0 | 1 | 1 | 0 | 0 | 0 | 0 | 1 |
| 14 | 0 | 0 | 1 | 1 | 1 | 0 | 0 | 0 | 0 | 1 |
| 15 | 0 | 1 | 1 | 1 | 1 | 0 | 0 | 0 | 0 | 1 |
| 16 | 0 | 0 | 0 | 0 | 0 | 1 | 0 | 0 | 0 | 1 |
| 17 | 0 | 1 | 0 | 0 | 0 | 1 | 0 | 0 | 0 | 1 |
| 18 | 0 | 0 | 1 | 0 | 0 | 1 | 0 | 0 | 0 | 1 |
| 19 | 0 | 1 | 1 | 0 | 0 | 1 | 0 | 0 | 0 | 1 |
| 20 | 0 | 0 | 0 | 1 | 0 | 1 | 0 | 0 | 0 | 1 |
| 21 | 0 | 1 | 0 | 1 | 0 | 1 | 0 | 0 | 0 | 1 |
| 22 | 0 | 0 | 1 | 1 | 0 | 1 | 0 | 0 | 0 | 1 |
| 23 | 0 | 1 | 1 | 1 | 0 | 1 | 0 | 0 | 0 | 1 |
| 24 | 0 | 0 | 0 | 0 | 1 | 1 | 0 | 0 | 0 | 1 |
| 25 | 0 | 1 | 0 | 0 | 1 | 1 | 0 | 0 | 0 | 1 |
| 26 | 0 | 0 | 1 | 0 | 1 | 1 | 0 | 0 | 0 | 1 |
| 27 | 0 | 1 | 1 | 0 | 1 | 1 | 0 | 0 | 0 | 1 |
| 28 | 0 | 0 | 0 | 1 | 1 | 1 | 0 | 0 | 0 | 1 |
| 29 | 0 | 1 | 0 | 1 | 1 | 1 | 0 | 0 | 0 | 1 |
| 30 | 0 | 0 | 1 | 1 | 1 | 1 | 0 | 0 | 0 | 1 |
| 31 | 0 | 1 | 1 | 1 | 1 | 1 | 0 | 0 | 0 | 1 |
| 32 | 0 | 0 | 0 | 0 | 0 | 0 | 1 | 0 | 0 | 1 |
| 33 | 0 | 1 | 0 | 0 | 0 | 0 | 1 | 0 | 0 | 1 |
| 34 | 0 | 0 | 1 | 0 | 0 | 0 | 1 | 0 | 0 | 1 |
| 35 | 0 | 1 | 1 | 0 | 0 | 0 | 1 | 0 | 0 | 1 |
| 36 | 0 | 0 | 0 | 1 | 0 | 0 | 1 | 0 | 0 | 1 |
| 37 | 0 | 1 | 0 | 1 | 0 | 0 | 1 | 0 | 0 | 1 |
| 38 | 0 | 0 | 1 | 1 | 0 | 0 | 1 | 0 | 0 | 1 |
| 39 | 0 | 1 | 1 | 1 | 0 | 0 | 1 | 0 | 0 | 1 |

| | 0 | 0 | 0 | 0 | 0 | 0 | 0 | 0 | 0 | 0 |
|---|---|---|---|---|---|---|---|---|---|---|
| | 1 | 2 | 3 | 4 | 5 | 6 | 7 | 8 | 9 | 10 |
| 40 | 0 | 0 | 0 | 0 | 1 | 0 | 1 | 0 | 0 | 1 |
| 41 | 0 | 1 | 0 | 0 | 1 | 0 | 1 | 0 | 0 | 1 |
| 42 | 0 | 0 | 1 | 0 | 1 | 0 | 1 | 0 | 0 | 1 |
| 43 | 0 | 1 | 1 | 0 | 1 | 0 | 1 | 0 | 0 | 1 |
| 44 | 0 | 0 | 0 | 1 | 1 | 0 | 1 | 0 | 0 | 1 |
| 45 | 0 | 1 | 0 | 1 | 1 | 0 | 1 | 0 | 0 | 1 |
| 46 | 0 | 0 | 1 | 1 | 1 | 0 | 1 | 0 | 0 | 1 |
| 47 | 0 | 1 | 1 | 1 | 1 | 0 | 1 | 0 | 0 | 1 |
| 48 | 0 | 0 | 0 | 0 | 0 | 1 | 1 | 0 | 0 | 1 |
| 49 | 0 | 1 | 1 | 1 | 1 | 1 | 1 | 0 | 0 | 1 |
| 50 | 0 | 0 | 0 | 0 | 0 | 0 | 0 | 0 | 1 | 1 |
| 51 | 0 | 0 | 0 | 0 | 0 | 0 | 0 | 0 | 1 | 1 |
| 52 | 0 | 0 | 0 | 0 | 0 | 0 | 0 | 0 | 1 | 1 |
| 53 | 0 | 0 | 0 | 0 | 0 | 0 | 0 | 0 | 1 | 1 |
| 54 | 0 | 0 | 0 | 0 | 0 | 0 | 0 | 0 | 1 | 1 |
| 55 | 0 | 0 | 0 | 0 | 0 | 0 | 0 | 0 | 1 | 1 |
| 56 | 0 | 0 | 0 | 0 | 0 | 0 | 0 | 0 | 1 | 1 |
| 57 | 0 | 0 | 0 | 0 | 0 | 0 | 0 | 0 | 1 | 1 |
| 58 | 0 | 0 | 0 | 0 | 0 | 0 | 0 | 0 | 1 | 1 |
| 59 | 0 | 0 | 0 | 0 | 0 | 0 | 0 | 0 | 1 | 1 |
| 60 | 0 | 0 | 0 | 0 | 0 | 0 | 0 | 0 | 1 | 1 |
| 61 | 0 | 0 | 0 | 0 | 0 | 0 | 0 | 0 | 1 | 1 |
| 62 | 0 | 0 | 0 | 0 | 0 | 0 | 0 | 0 | 1 | 1 |
| 63 | 0 | 0 | 0 | 0 | 0 | 0 | 0 | 0 | 1 | 1 |
| 64 | 0 | 0 | 0 | 0 | 0 | 0 | 0 | 0 | 1 | 1 |
| 65 | 0 | 0 | 0 | 0 | 0 | 0 | 0 | 0 | 1 | 1 |
| 66 | 0 | 0 | 0 | 0 | 0 | 0 | 0 | 0 | 1 | 1 |
| 67 | 0 | 0 | 0 | 0 | 0 | 0 | 0 | 0 | 1 | 1 |
| 68 | 0 | 0 | 0 | 0 | 0 | 0 | 0 | 0 | 1 | 1 |
| 69 | 0 | 0 | 0 | 0 | 0 | 0 | 0 | 0 | 1 | 1 |
| 70 | 0 | 0 | 0 | 0 | 0 | 0 | 0 | 0 | 1 | 1 |
| 71 | 0 | 0 | 0 | 0 | 0 | 0 | 0 | 0 | 1 | 1 |
| 72 | 0 | 0 | 0 | 0 | 0 | 0 | 0 | 0 | 1 | 1 |
| 73 | 0 | 0 | 0 | 0 | 0 | 0 | 0 | 0 | 1 | 1 |
| 74 | 0 | 0 | 0 | 0 | 0 | 0 | 0 | 0 | 1 | 1 |
| 75 | 0 | 0 | 0 | 0 | 0 | 0 | 0 | 0 | 1 | 1 |
| 76 | 0 | 0 | 0 | 0 | 0 | 0 | 0 | 0 | 1 | 1 |
| 77 | 0 | 0 | 0 | 0 | 0 | 0 | 0 | 0 | 1 | 1 |
| 78 | 0 | 0 | 0 | 0 | 0 | 0 | 0 | 0 | 1 | 1 |

Fig. 13

MODE 3

KEY ↓

| | $O_1$ | $O_2$ | $O_3$ | $O_4$ | $O_5$ | $O_6$ | $O_7$ | $O_8$ | $O_9$ | $O_{10}$ |
|---|---|---|---|---|---|---|---|---|---|---|
| 1 | 1 | 1 | 0 | 0 | 0 | 0 | 0 | 0 | 0 | 1 |
| 2 | 1 | 0 | 1 | 0 | 0 | 0 | 0 | 0 | 0 | 1 |
| 3 | 1 | 1 | 1 | 0 | 0 | 0 | 0 | 0 | 0 | 1 |
| 4 | 1 | 0 | 0 | 1 | 0 | 0 | 0 | 0 | 0 | 1 |
| 5 | 1 | 1 | 0 | 1 | 0 | 0 | 0 | 0 | 0 | 1 |
| 6 | 1 | 0 | 1 | 1 | 0 | 0 | 0 | 0 | 0 | 1 |
| 7 | 1 | 1 | 1 | 1 | 0 | 0 | 0 | 0 | 0 | 1 |
| 8 | 1 | 0 | 0 | 0 | 1 | 0 | 0 | 0 | 0 | 1 |
| 9 | 1 | 1 | 0 | 0 | 1 | 0 | 0 | 0 | 0 | 1 |
| 10 | 1 | 0 | 1 | 0 | 1 | 0 | 0 | 0 | 0 | 1 |
| 11 | 1 | 1 | 1 | 0 | 1 | 0 | 0 | 0 | 0 | 1 |
| 12 | 1 | 0 | 0 | 1 | 1 | 0 | 0 | 0 | 0 | 1 |
| 13 | 1 | 1 | 0 | 1 | 1 | 0 | 0 | 0 | 0 | 1 |
| 14 | 1 | 0 | 1 | 1 | 1 | 0 | 0 | 0 | 0 | 1 |
| 15 | 1 | 1 | 1 | 1 | 1 | 0 | 0 | 0 | 0 | 1 |
| 16 | 1 | 0 | 0 | 0 | 0 | 1 | 0 | 0 | 0 | 1 |
| 17 | 1 | 1 | 0 | 0 | 0 | 1 | 0 | 0 | 0 | 1 |
| 18 | 1 | 0 | 1 | 0 | 0 | 1 | 0 | 0 | 0 | 1 |
| 19 | 1 | 1 | 1 | 0 | 0 | 1 | 0 | 0 | 0 | 1 |
| 20 | 1 | 0 | 0 | 1 | 0 | 1 | 0 | 0 | 0 | 1 |
| 21 | 1 | 1 | 0 | 1 | 0 | 1 | 0 | 0 | 0 | 1 |
| 22 | 1 | 0 | 1 | 1 | 0 | 1 | 0 | 0 | 0 | 1 |
| 23 | 1 | 1 | 1 | 1 | 0 | 1 | 0 | 0 | 0 | 1 |
| 24 | 1 | 0 | 0 | 0 | 1 | 1 | 0 | 0 | 0 | 1 |
| 25 | 1 | 1 | 0 | 0 | 1 | 1 | 0 | 0 | 0 | 1 |
| 26 | 1 | 0 | 1 | 0 | 1 | 1 | 0 | 0 | 0 | 1 |
| 27 | 1 | 1 | 1 | 0 | 1 | 1 | 0 | 0 | 0 | 1 |
| 28 | 1 | 0 | 0 | 1 | 1 | 1 | 0 | 0 | 0 | 1 |
| 29 | 1 | 1 | 0 | 1 | 1 | 1 | 0 | 0 | 0 | 1 |
| 30 | 1 | 0 | 1 | 1 | 1 | 1 | 0 | 0 | 0 | 1 |
| 31 | 1 | 1 | 1 | 1 | 1 | 1 | 0 | 0 | 0 | 1 |
| 32 | 1 | 0 | 0 | 0 | 0 | 0 | 1 | 0 | 0 | 1 |
| 33 | 1 | 1 | 0 | 0 | 0 | 0 | 1 | 0 | 0 | 1 |
| 34 | 1 | 0 | 1 | 0 | 0 | 0 | 1 | 0 | 0 | 1 |
| 35 | 1 | 1 | 1 | 0 | 0 | 0 | 1 | 0 | 0 | 1 |
| 36 | 1 | 0 | 0 | 1 | 0 | 0 | 1 | 0 | 0 | 1 |
| 37 | 1 | 1 | 0 | 1 | 0 | 0 | 1 | 0 | 0 | 1 |
| 38 | 1 | 0 | 1 | 1 | 0 | 0 | 1 | 0 | 0 | 1 |
| 39 | 1 | 1 | 1 | 1 | 0 | 0 | 1 | 0 | 0 | 1 |

| | $O_1$ | $O_2$ | $O_3$ | $O_4$ | $O_5$ | $O_6$ | $O_7$ | $O_8$ | $O_9$ | $O_{10}$ |
|---|---|---|---|---|---|---|---|---|---|---|
| 40 | 1 | 0 | 0 | 0 | 1 | 0 | 1 | 0 | 0 | 1 |
| 41 | 1 | 1 | 0 | 0 | 1 | 0 | 1 | 0 | 0 | 1 |
| 42 | 1 | 0 | 1 | 0 | 1 | 0 | 1 | 0 | 0 | 1 |
| 43 | 1 | 1 | 1 | 0 | 1 | 0 | 1 | 0 | 0 | 1 |
| 44 | 1 | 0 | 0 | 1 | 1 | 0 | 1 | 0 | 0 | 1 |
| 45 | 1 | 1 | 0 | 1 | 1 | 0 | 1 | 0 | 0 | 1 |
| 46 | 1 | 0 | 1 | 1 | 1 | 0 | 1 | 0 | 0 | 1 |
| 47 | 1 | 1 | 1 | 1 | 1 | 0 | 1 | 0 | 0 | 1 |
| 48 | 1 | 0 | 0 | 0 | 0 | 1 | 1 | 0 | 0 | 1 |
| 49 | 1 | 1 | 1 | 1 | 1 | 1 | 1 | 0 | 0 | 1 |
| 50 | 1 | 0 | 0 | 0 | 0 | 0 | 0 | 0 | 1 | 1 |
| 51 | 1 | 0 | 0 | 0 | 0 | 0 | 0 | 0 | 1 | 1 |
| 52 | 1 | 0 | 0 | 0 | 0 | 0 | 0 | 0 | 1 | 1 |
| 53 | 1 | 0 | 0 | 0 | 0 | 0 | 0 | 0 | 1 | 1 |
| 54 | 1 | 0 | 0 | 0 | 0 | 0 | 0 | 0 | 1 | 1 |
| 55 | 1 | 0 | 0 | 0 | 0 | 0 | 0 | 0 | 1 | 1 |
| 56 | 1 | 0 | 0 | 0 | 0 | 0 | 0 | 0 | 1 | 1 |
| 57 | 1 | 0 | 0 | 0 | 0 | 0 | 0 | 0 | 1 | 1 |
| 58 | 1 | 0 | 0 | 0 | 0 | 0 | 0 | 0 | 1 | 1 |
| 59 | 1 | 0 | 0 | 0 | 0 | 0 | 0 | 0 | 1 | 1 |
| 60 | 1 | 0 | 0 | 0 | 0 | 0 | 0 | 0 | 1 | 1 |
| 61 | 1 | 0 | 0 | 0 | 0 | 0 | 0 | 0 | 1 | 1 |
| 62 | 1 | 0 | 0 | 0 | 0 | 0 | 0 | 0 | 1 | 1 |
| 63 | 1 | 0 | 0 | 0 | 0 | 0 | 0 | 0 | 1 | 1 |
| 64 | 1 | 0 | 0 | 0 | 0 | 0 | 0 | 0 | 1 | 1 |
| 65 | 1 | 0 | 0 | 0 | 0 | 0 | 0 | 0 | 1 | 1 |
| 66 | 1 | 0 | 0 | 0 | 0 | 0 | 0 | 0 | 1 | 1 |
| 67 | 1 | 0 | 0 | 0 | 0 | 0 | 0 | 0 | 1 | 1 |
| 68 | 1 | 0 | 0 | 0 | 0 | 0 | 0 | 0 | 1 | 1 |
| 69 | 1 | 0 | 0 | 0 | 0 | 0 | 0 | 0 | 1 | 1 |
| 70 | 1 | 0 | 0 | 0 | 0 | 0 | 0 | 0 | 1 | 1 |
| 71 | 1 | 0 | 0 | 0 | 0 | 0 | 0 | 0 | 1 | 1 |
| 72 | 1 | 0 | 0 | 0 | 0 | 0 | 0 | 0 | 1 | 1 |
| 73 | 1 | 0 | 0 | 0 | 0 | 0 | 0 | 0 | 1 | 1 |
| 74 | 1 | 0 | 0 | 0 | 0 | 0 | 0 | 0 | 1 | 1 |
| 75 | 1 | 0 | 0 | 0 | 0 | 0 | 0 | 0 | 1 | 1 |
| 76 | 1 | 0 | 0 | 0 | 0 | 0 | 0 | 0 | 1 | 1 |
| 77 | 1 | 0 | 0 | 0 | 0 | 0 | 0 | 0 | 1 | 1 |
| 78 | 1 | 0 | 0 | 0 | 0 | 0 | 0 | 0 | 1 | 1 |

Fig. 14

MODE 4

KEY ↓

| | $O_1$ | $O_2$ | $O_3$ | $O_4$ | $O_5$ | $O_6$ | $O_7$ | $O_8$ | $O_9$ | $O_{10}$ |
|---|---|---|---|---|---|---|---|---|---|---|
| 1 | 0 | 0 | 0 | 0 | 0 | 0 | 0 | 0 | 1 | 0 |
| 2 | 0 | 0 | 0 | 0 | 0 | 0 | 0 | 0 | 1 | 0 |
| 3 | 0 | 0 | 0 | 0 | 0 | 0 | 0 | 0 | 1 | 0 |
| 4 | 0 | 0 | 0 | 0 | 0 | 0 | 0 | 0 | 1 | 0 |
| 5 | 0 | 0 | 0 | 0 | 0 | 0 | 0 | 0 | 1 | 0 |
| 6 | 0 | 0 | 0 | 0 | 0 | 0 | 0 | 0 | 1 | 0 |
| 7 | 0 | 0 | 0 | 0 | 0 | 0 | 0 | 0 | 1 | 0 |
| 8 | 0 | 0 | 0 | 0 | 0 | 0 | 0 | 0 | 1 | 0 |
| 9 | 0 | 0 | 0 | 0 | 0 | 0 | 0 | 0 | 1 | 0 |
| 10 | 0 | 0 | 0 | 0 | 0 | 0 | 0 | 0 | 1 | 0 |
| 11 | 0 | 0 | 0 | 0 | 0 | 0 | 0 | 0 | 1 | 0 |
| 12 | 0 | 0 | 0 | 0 | 0 | 0 | 0 | 0 | 1 | 0 |
| 13 | 0 | 0 | 0 | 0 | 0 | 0 | 0 | 0 | 1 | 0 |
| 14 | 0 | 0 | 0 | 0 | 0 | 0 | 0 | 0 | 1 | 0 |
| 15 | 0 | 0 | 0 | 0 | 0 | 0 | 0 | 0 | 1 | 0 |
| 16 | 0 | 0 | 0 | 0 | 0 | 0 | 0 | 0 | 1 | 0 |
| 17 | 0 | 0 | 0 | 0 | 0 | 0 | 0 | 0 | 1 | 0 |
| 18 | 0 | 0 | 0 | 0 | 0 | 0 | 0 | 0 | 1 | 0 |
| 19 | 0 | 0 | 0 | 0 | 0 | 0 | 0 | 0 | 1 | 0 |
| 20 | 0 | 0 | 0 | 0 | 0 | 0 | 0 | 0 | 1 | 0 |
| 21 | 0 | 0 | 0 | 0 | 0 | 0 | 0 | 0 | 1 | 0 |
| 22 | 0 | 0 | 0 | 0 | 0 | 0 | 0 | 0 | 1 | 0 |
| 23 | 0 | 0 | 0 | 0 | 0 | 0 | 0 | 0 | 1 | 0 |
| 24 | 0 | 0 | 0 | 0 | 0 | 0 | 0 | 0 | 1 | 0 |
| 25 | 0 | 0 | 0 | 0 | 0 | 0 | 0 | 0 | 1 | 0 |
| 26 | 0 | 0 | 0 | 0 | 0 | 0 | 0 | 0 | 1 | 0 |
| 27 | 0 | 0 | 0 | 0 | 0 | 0 | 0 | 0 | 1 | 0 |
| 28 | 0 | 0 | 0 | 0 | 0 | 0 | 0 | 0 | 1 | 0 |
| 29 | 0 | 0 | 0 | 0 | 0 | 0 | 0 | 0 | 1 | 0 |
| 30 | 0 | 0 | 0 | 0 | 0 | 0 | 0 | 0 | 1 | 0 |
| 31 | 0 | 0 | 0 | 0 | 0 | 0 | 0 | 0 | 1 | 0 |
| 32 | 0 | 0 | 0 | 0 | 0 | 0 | 0 | 0 | 1 | 0 |
| 33 | 0 | 0 | 0 | 0 | 0 | 0 | 0 | 0 | 1 | 0 |
| 34 | 0 | 0 | 0 | 0 | 0 | 0 | 0 | 0 | 1 | 0 |
| 35 | 0 | 0 | 0 | 0 | 0 | 0 | 0 | 0 | 1 | 0 |
| 36 | 0 | 0 | 0 | 0 | 0 | 0 | 0 | 0 | 1 | 0 |
| 37 | 0 | 0 | 0 | 0 | 0 | 0 | 0 | 0 | 1 | 0 |
| 38 | 0 | 0 | 0 | 0 | 0 | 0 | 0 | 0 | 1 | 0 |
| 39 | 0 | 0 | 0 | 0 | 0 | 0 | 0 | 0 | 1 | 0 |

| | $O_1$ | $O_2$ | $O_3$ | $O_4$ | $O_5$ | $O_6$ | $O_7$ | $O_8$ | $O_9$ | $O_{10}$ |
|---|---|---|---|---|---|---|---|---|---|---|
| 40 | 0 | 0 | 0 | 0 | 0 | 0 | 0 | 0 | 1 | 0 |
| 41 | 0 | 0 | 0 | 0 | 0 | 0 | 0 | 0 | 1 | 0 |
| 42 | 0 | 0 | 0 | 0 | 0 | 0 | 0 | 0 | 1 | 0 |
| 43 | 0 | 0 | 0 | 0 | 0 | 0 | 0 | 0 | 1 | 0 |
| 44 | 0 | 0 | 0 | 0 | 0 | 0 | 0 | 0 | 1 | 0 |
| 45 | 0 | 0 | 0 | 0 | 0 | 0 | 0 | 0 | 1 | 0 |
| 46 | 0 | 0 | 0 | 0 | 0 | 0 | 0 | 0 | 1 | 0 |
| 47 | 0 | 0 | 0 | 0 | 0 | 0 | 0 | 0 | 1 | 0 |
| 48 | 0 | 0 | 0 | 0 | 0 | 0 | 0 | 0 | 1 | 0 |
| 49 | 0 | 1 | 1 | 1 | 1 | 1 | 1 | 0 | 0 | 0 |
| 50 | 0 | 0 | 0 | 0 | 0 | 0 | 0 | 0 | 0 | 0 |
| 51 | 0 | 1 | 0 | 0 | 0 | 0 | 0 | 0 | 0 | 0 |
| 52 | 0 | 0 | 1 | 0 | 0 | 0 | 0 | 0 | 0 | 0 |
| 53 | 0 | 1 | 1 | 0 | 0 | 0 | 0 | 0 | 0 | 0 |
| 54 | 0 | 0 | 0 | 1 | 0 | 0 | 0 | 0 | 0 | 0 |
| 55 | 0 | 1 | 0 | 1 | 0 | 0 | 0 | 0 | 0 | 0 |
| 56 | 0 | 0 | 1 | 1 | 0 | 0 | 0 | 0 | 0 | 0 |
| 57 | 0 | 1 | 1 | 1 | 0 | 0 | 0 | 0 | 0 | 0 |
| 58 | 0 | 0 | 0 | 0 | 1 | 0 | 0 | 0 | 0 | 0 |
| 59 | 0 | 1 | 0 | 0 | 1 | 0 | 0 | 0 | 0 | 0 |
| 60 | 0 | 0 | 0 | 0 | 0 | 0 | 0 | 0 | 1 | 0 |
| 61 | 0 | 0 | 0 | 0 | 0 | 0 | 0 | 0 | 1 | 0 |
| 62 | 0 | 0 | 0 | 0 | 0 | 0 | 0 | 0 | 1 | 0 |
| 63 | 0 | 0 | 0 | 0 | 0 | 0 | 0 | 0 | 1 | 0 |
| 64 | 0 | 0 | 0 | 0 | 0 | 0 | 0 | 0 | 1 | 0 |
| 65 | 0 | 0 | 0 | 0 | 0 | 0 | 0 | 0 | 1 | 0 |
| 66 | 0 | 0 | 0 | 0 | 0 | 0 | 0 | 0 | 1 | 0 |
| 67 | 0 | 0 | 0 | 0 | 0 | 0 | 0 | 0 | 1 | 0 |
| 68 | 0 | 0 | 0 | 0 | 0 | 0 | 0 | 0 | 1 | 0 |
| 69 | 0 | 0 | 0 | 0 | 0 | 0 | 0 | 0 | 1 | 0 |
| 70 | 0 | 0 | 0 | 0 | 0 | 0 | 0 | 0 | 1 | 0 |
| 71 | 0 | 0 | 0 | 0 | 0 | 0 | 0 | 0 | 1 | 0 |
| 72 | 0 | 0 | 0 | 0 | 0 | 0 | 0 | 0 | 1 | 0 |
| 73 | 0 | 0 | 0 | 0 | 0 | 0 | 0 | 0 | 1 | 0 |
| 74 | 0 | 0 | 0 | 0 | 0 | 0 | 0 | 0 | 1 | 0 |
| 75 | 0 | 0 | 0 | 0 | 0 | 0 | 0 | 0 | 1 | 0 |
| 76 | 0 | 0 | 0 | 0 | 0 | 0 | 0 | 0 | 1 | 0 |
| 77 | 0 | 0 | 0 | 0 | 0 | 0 | 0 | 0 | 1 | 0 |
| 78 | 0 | 0 | 0 | 0 | 0 | 0 | 0 | 0 | 1 | 0 |

Fig. 15

KEYBOARD ENCODER SYSTEM

This invention relates to digital keyboard information transmission systems, and more particularly to an encoder system providing means for reducing the number of outputs from a keyboard wherein each character key provides only two output signals.

In the computer industry, it is necessary to transmit digital information from a highly reliable keyboard terminal system to other peripheral equipment such as tape or card punching apparatus, temporary or permanent information storage buffers or central processors. To transmit such information, typically in straight binary or binary-coded decimal form, an industry standard code or a code to meet a user's special requirements, the signals received from the keys of the keyboard must be encoded to the particular coded output signal whereby a maximum amount of information is transmitted in a minimum, industry standard, or specially required number of bit positions. These bit positions are then transmitted sequentially over a single transmission line to the peripheral equipment or each bit is transmitted over a separate parallel transmission line or channel.

In particular, an improved keyboard system utilizes a keyboard comprised of contactless-type keys such as capacitive-coupled or Hall-effect devices, wherein each key provides only two outputs. When a key of the Hall-effect keyboard is depressed, a magnetic field surrounds a metallic epitaxial layer on a chip of P-type silicon, whose current is perpendicular to the field. The Hall voltage, developed perpendicular to both the current and field, is in the order of microvolts. An amplifier increases this voltage to a usable level and then flips a trigger which switches the amplifier's output to only two of the keyboard's output lines representing a code for the depressed character key. An improved, error correcting encoder system, which is capable of being built on a single semiconductor chip, is desired to convert the two amplified output signals from each key of the keyboard to a binary-coded output signal capable of being transmitted in a minimum, industry standard, or specially required number of bit positions to peripheral equipment.

It is therefore an object of the present invention to provide improved means for encoding the output signals from a keyboard, wherein each character key of said keyboard provides only two output signals, to a desired binary-coded signal.

Another object of the invention is to provide inexpensive means for reducing the number of output connections from a digital keyboard information system, wherein each character key of said keyboard provides only two output signals, to peripheral equipment such as a digital computer.

A further object of the invention is to provide a keyboard encoder system which includes digital correction means whereby no signal is transmitted when two or more character keys of the keyboard are depressed simultaneously.

It is still another object of the invention to provide an improved keyboard encoder system, wherein each character key of said keyboard provides only two output signals, capable of being fabricated on a single semiconductor chip.

Yet a further object of the invention is to provide an improved keyboard encoder system which is compatible with the reliability of noncontact, Hall-effect keyboard devices.

A feature of the invention allows digital rather than analog correction means whereby no signal is transmitted when two or more character keys of the keyboard are depressed simultaneously.

These and other objects and features are accomplished in accordance with the present invention by providing an encoder system for a digital keyboard information transmission system wherein each character key of the keyboard provides only two data signals transmitted in various combinations from the keyboard to the inputs of the encoder. Shift keys on the keyboard provide at least two shift signals, representing, for example, upper and lower case alphabet characters or alphabet and numeric characters respectively. Means is provided for decoding the data output signals into separate signals each representing a single depressed key. The separate signals are then converted into an expanded binary signal representation having a plurality of bit positions. Means is provided for gating such expanded binary signal in accordance with the shift signals to provide a binary-coded output signal which is then transmitted to the peripheral equipment over a number of parallel transmission lines or frequency channels, each line or channel representing a single bit position, or over a single transmission line wherein each bit position is sequentially transmitted. The output signal requires a reduced number of bit positions which is either in accordance with an industry standard, the special requirements of a user of the system, or minimized. A feature of the invention provides means for developing a digital error signal when two or more of the character keys are depressed simultaneously whereby no information is transmitted under such condition. Embodiments of the invention provide means whereby the shift signals are transmitted to the encoder system in binary combinations and are then expanded into three or more modes whereby only certain ones of the bit positions of the expanded binary signal are selected to form the binary coded output signal. Other embodiments of the invention provide means for temporarily storing the binary coded output signal prior to its transmission to other peripheral equipment such as a central processor or memory buffer and means for controlling and synchronizing such peripheral equipment.

Other objects and advantages of the invention will be apparent from the detailed description and claims and from the accompanying drawings wherein:

FIG. 3 illustrates an example of output signals from character keys of a keyboard utilized in conjunction with the embodiment of FIG. 2.

FIGS. 4 and 5 illustrate the interconnection of logic gates comprising the decoding means of FIG. 2 to operate in conjunction with the particular output signals embodied in FIG. 3.

FIGS. 6, 7, 8 and 9 illustrate an example of the interconnection of logic gates comprising the decoding means to logic gates comprising the conversion means illustrated in FIG. 2 to achieve one particular scheme of binary-coded output signals.

FIG. 11 illustrates an example of interconnecting the logic gates comprising the gating means of FIG. 10 to produce one particular scheme of mode signals from shift signals.

FIGS. 12, 13, 14 and 15 illustrate the particular binary-coded output signal provided by the system embodied in FIGS. 2 through 11.

In general, the encoder system of the invention utilizes logic gates and timing circuits to provide a desired binary-coded output signal from information transmitted to the system from a keyboard wherein each character key provides only two data signals and one or more shift keys provide at least two shift signals.

Each of the logic gates and timing circuits utilized in the system may be fabricated by any conventional technique including tube or diode logic. Preferably, however, these gates are comprised of semiconductor devices utilizing, for example, transistor-transistor logic or insulated gate field effect transistors. In so using these various components the encoder system of the invention is capable of being fabricated as an integrated circuit on a single semiconductor substrate using present semiconductor techniques.

Essentially, the system is comprised of means for decoding combination data output signals from the character keys into separate signals representative of a single depressed key, means for converting these separate signals into an expanded binary signal according to some predetermined desired output signal and means for gating the expanded binary signal in accordance with shift signals to achieve that desired output signal. In an embodiment of the invention, the keys are comprised of contactless-type switches such as capacitive-coupled or Hall-effect devices whereby the two data signals (each signal representing a logic "1") are transmitted to the encoder system. The output signal from the encoder system is a binary-coded signal having a plurality of bit positions, each bit position being transmitted sequentially over a single line or channel or over separate lines or channels to peripheral equipment. The number of bit positions utilized for such output signal is either minimized, represents some standard industry code, or represents some special customer requirement.

Figure 1:
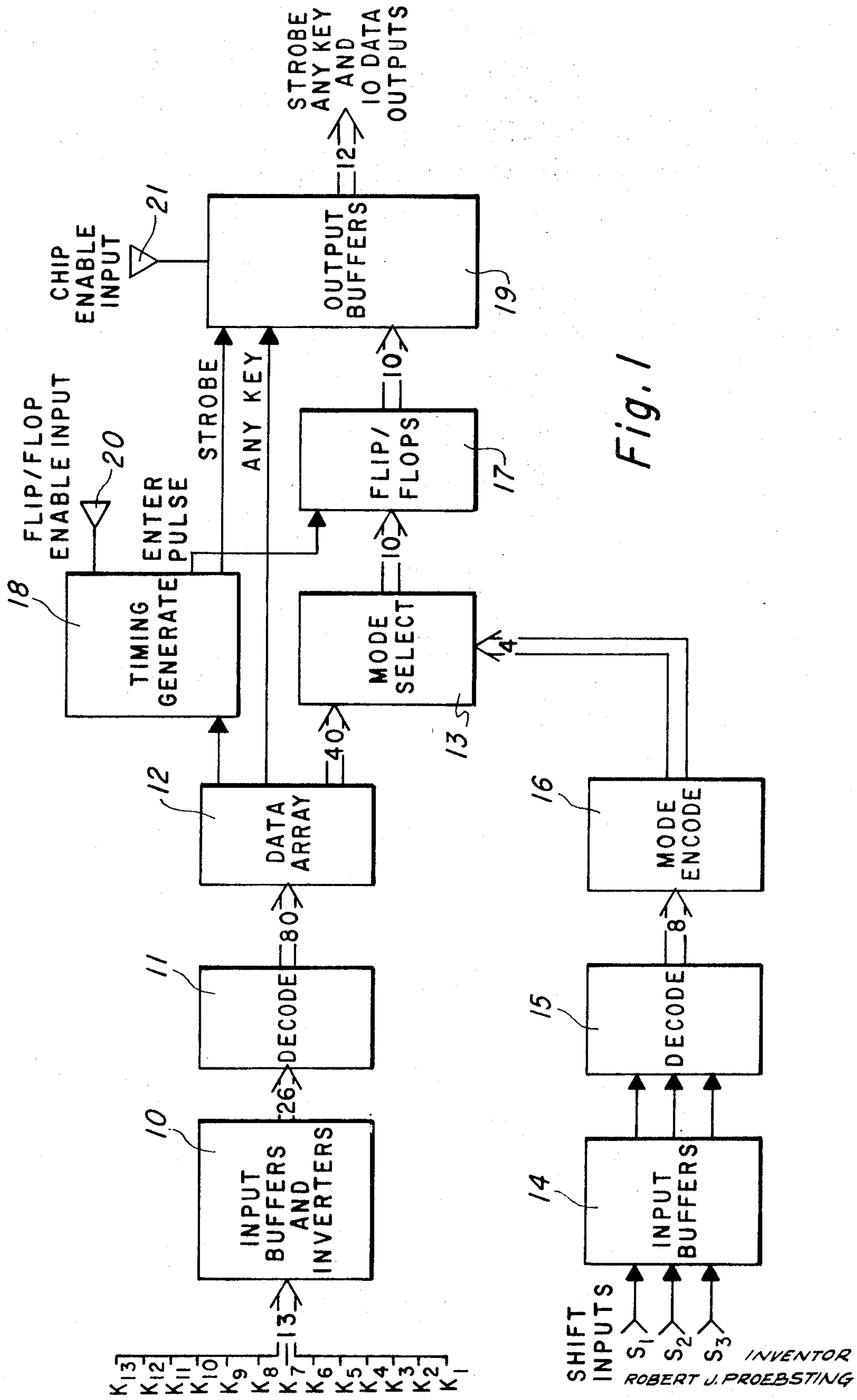
FIG. 1 illustrates an embodiment of the keyboard encoder system of the invention.

One embodiment of the encoder system of the invention, as illustrated in FIG. 1, provides, for example, a desired 10-bit binary data output signal representing information transmitted from a 78-key keyboard. As there are 78 character keys, and each key provides only two output signals, 13 lines or channels $K_1$, $K_2$. . . $K_{12}$ and $K_{13}$ are necessary to transmit the 78 combinations, each of two binary "1" signals, to input buffer 10 of the encoder system. Input buffer 10 forms the complement of each bit of data transmitted over channel $K_1$, $K_2$. . . $K_{12}$ and $K_{13}$ whereby a total of 26 bits of data are transmitted to decoder means 11. The signals from the keys and their complements are gated by decoder means 11 whereby 78 separate signals are produced, each signal representing a single depressed key. Two additional signals are transmitted from decoder means 11 representing, for example, a no-key depressed condition, providing a total of 80 separate signals. These 80 signals are gated by data array 12. Array 12 converts the separate signals into an expanded binary signal according to some predetermined desired output signal. In the particular embodiment illustrated, a total of 40 bit positions are utilized to represent the expanded binary signal and a total of 10 bit positions are desired for the binary-coded output signal. In order to achieve such output signal, mode selection means 13 allows only 10 of the 40 bit positions representing a single alphabet, numeric or command key code to transmit data to peripheral equipment. This is accomplished by dividing the 40 bit positions by four, each of the four sets representing a separate mode of operation. These modes may be provided in one of several ways. For example, a separate shift key may be provided for each mode or two shift keys may be utilized to provide four combinations {0,0}, {0,1}, {1,0} and {1,1}, each combination representing a mode. In the illustrated embodiment, however, three shift signals $S_1$, $S_2$ and $S_3$ are transmitted from the keyboard to the encoder system. These three shift signals may be provided by three separate shift keys, each providing a signal representing a binary "1" when a particular key is depressed. Shift signals $S_1$, $S_2$ and $S_3$ are introduced into input buffer 14 where complements of the signals are formed. The shift signals and their complements are then decoded by logic gates comprising decode means 15 whereby eight combinations $\{\overline{S}_1, \overline{S}_2, \overline{S}_3\}$, $\{S_1, \overline{S}_2, \overline{S}_3\}$, $\{\overline{S}_1, S_2, \overline{S}_3\}$, $\{S_1, S_2, \overline{S}_3\}$, $\{\overline{S}_1, \overline{S}_2, S_3\}$, $\{S_1, \overline{S}_2, S_3\}$, $\{\overline{S}_1, S_2, S_3\}$, and $\{S_1, S_2, S_3\}$ are gated. Combinations of one or more of the eight are encoded into the four required modes by mode encode means 16. For example, each two of the above eight combinations might represent one mode.

The 10 bits selected to form the character data output signal in accordance with one of the four modes is transmitted from mode select means to a series of 10 flip-flops comprising temporary storage means 17.

New output data is clocked into flip-flops 17 by a pulse transmitted from timing generator 18. Generator 18 is operated by a signal from data array 12 which indicates that a new key has been depressed. When such new key is depressed, an "ANY KEY" signal is also sent out to the peripheral equipment, indicating that a key is being depressed. Timing generator 18 also provides a "STROBE" signal which may be utilized to synchronize the peripheral equipment with the temporary storage means provided by flip-flops 17, thereby indicating when new output data is being made available for such peripheral equipment.

In addition, two features are provided by the illustrated embodiment. Firstly, a flip-flop enable input 20 provides means for preventing a pulse from being generated by timing generator 18 no matter how many keys are depressed. Secondly, a chip enable input 21 allows the information stored in flip-flops 17 to change as a new key is depressed but prevents such temporarily stored information from being transmitted via output buffers 19 to the peripheral equipment.

As illustrated, an output signal with a total 12 bit positions is transmitted from output buffers 19 to the peripheral equipment. The output signal is comprised of the 10-bit binary data signal plus one channel for the "ANY KEY" signal and one channel for the "STROBE" signal.

Figures 2, 10:
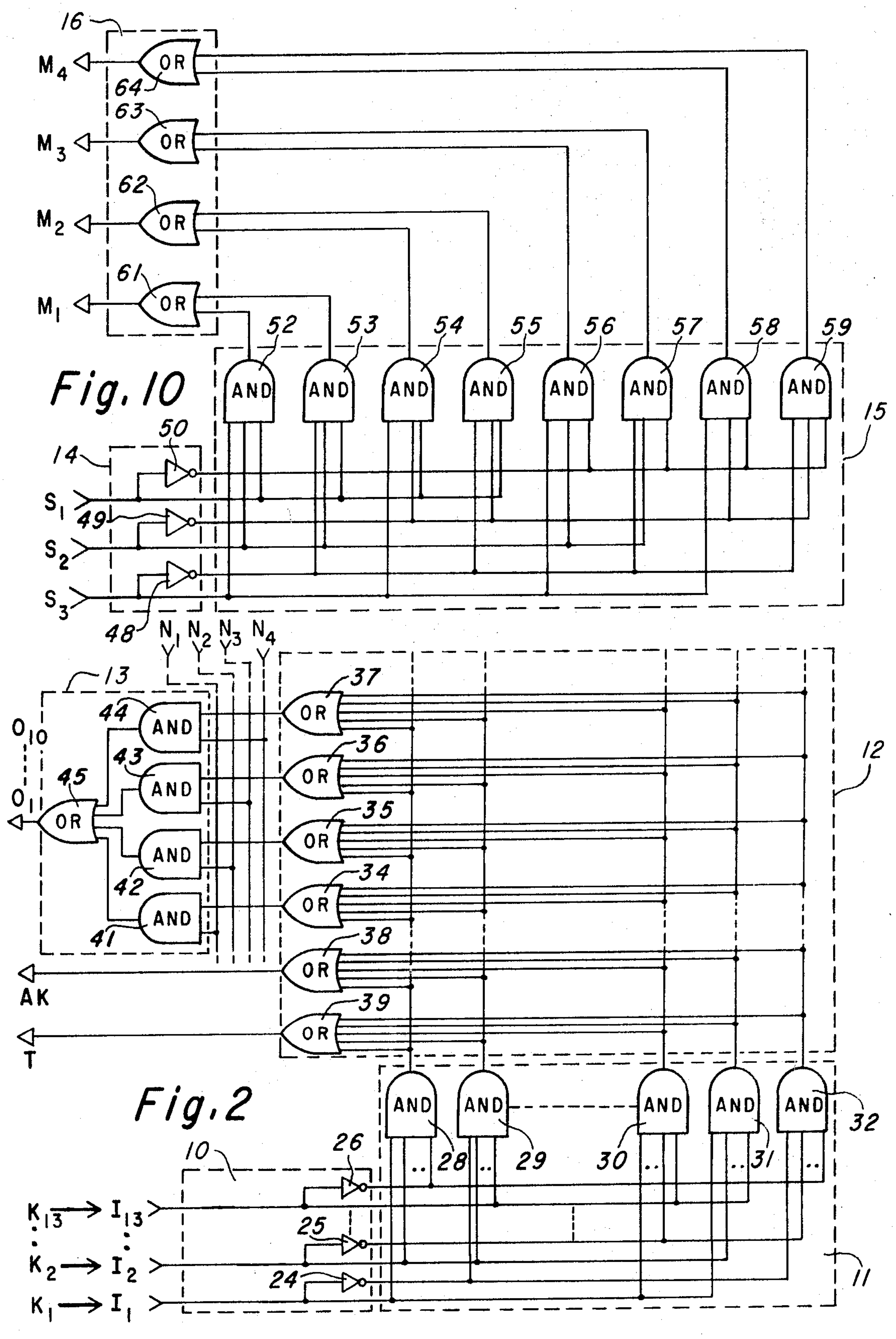
FIG. 2 illustrates means employed in an embodiment of the invention for decoding data output signals representing a single depressed key, means for converting such separate signals into an expanded binary signal and means for gating such expanded binary signal to provide a binary-coded output signal.
FIG. 10 illustrates an embodiment of part of the gating means of FIG. 2 including means for converting shift signals into mode signals.
Figure 8:
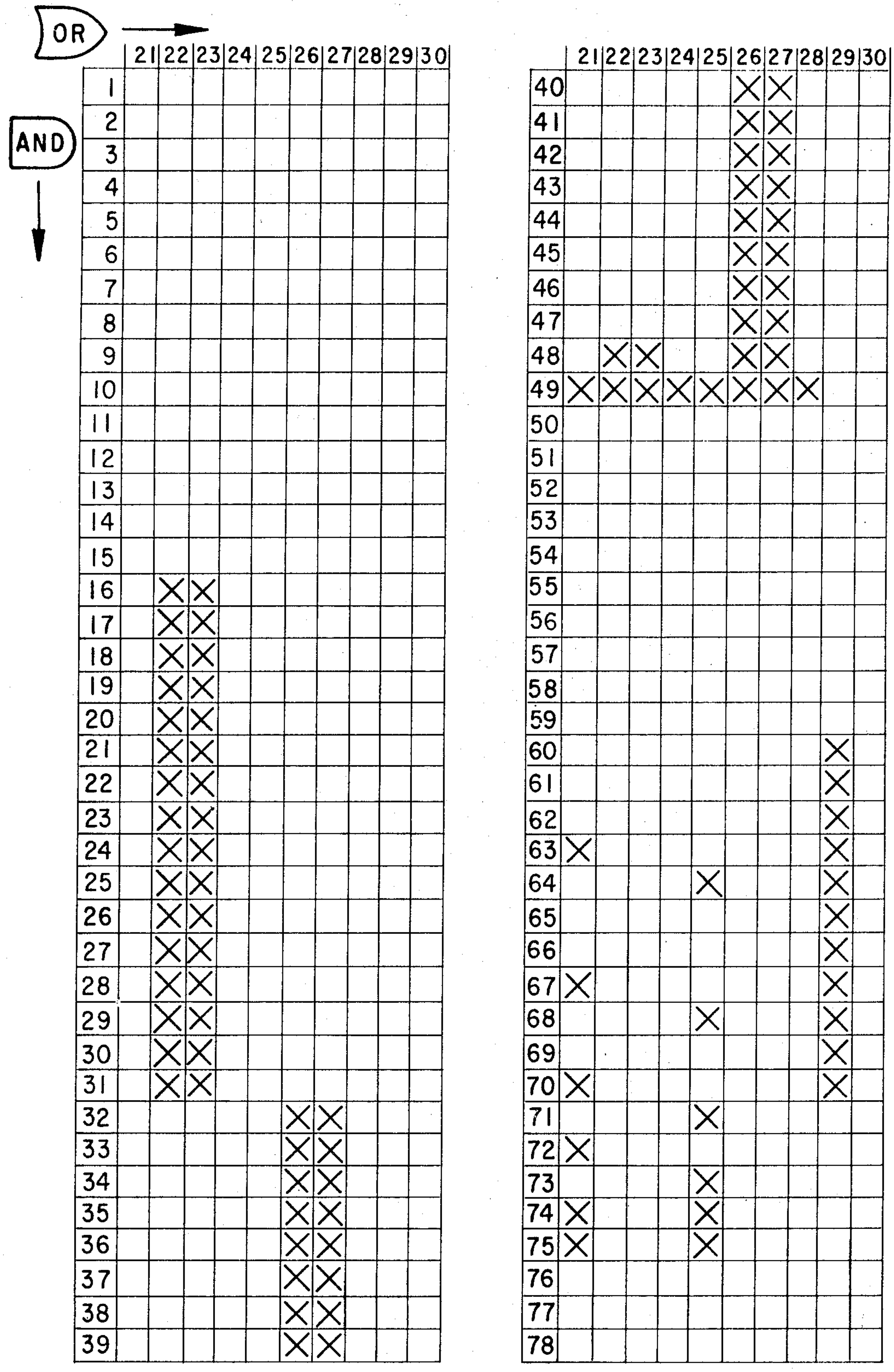

A more detailed logic diagram of several of the components employed in a 78-key embodiment of the invention is illustrated in FIG. 2. Signals from each of the 13 output lines $K_1$, $K_2$...$K_{13}$ of the keyboard are introduced into inputs $I_1$, $I_2$...$I_{13}$, respectively, of input buffer 10. Essentially, buffer 10 is comprised of 13 inverter or NOT gates, one for each input line or channel $I_1$, $I_2I_{13}$, of which three 24, 25 and 26 are shown. The inverter gates from the complements of each of the 13 signals introduced at $I_1$, $I_2$...$I_{13}$ whereby $\overline{I}_1$, $\overline{I}_2$...$\overline{I}_{13}$ are formed. Both the input signals and their complements are then transmitted to decoder means 11.

A plurality of AND gates, 79 or 80 for a 78-key keyboard, for example, comprise decoder means 11. Only five of these AND-gates 28, 29, 30, 31 and 32 are shown. Each AND gate has 13 inputs of which only a few are shown by way of example. These 13 inputs each correspond to one of the buffer inputs $I_1$, $I_2$...$I_{13}$ and is either connected to its corresponding input "I" or complement "$\overline{I}$." More particularly, in the 78-key embodiment of the invention, only two of the inputs of at least 78 and AND-gates 28, 29, 39, etc., are selectively connected to "I's" while the remaining eleven inputs are connected to "$\overline{I}$'s.' Each of the at least 78 AND-gates thereby provide a logical "1" output signal only when one key corresponding to that particular AND gate is depressed.

In order to more fully understand the encoder system to the invention a hypothetical example of one particular keyboard output scheme and of one particular desired output code is now discussed in detail. These examples, and the resulting logic gate interconnection schemes are for purposes of illustration only and are in no way to be construed as a limitation of the invention. Referring then to FIG. 3, combinations of two logical "1" output signals (represented by "X's") for each key of a 78 key keyboard are shown. These combinations of keyboard signals are transmitted on 13 output lines or channels $K_1$, $K_2$. . . $K_{13}$ and are introduced into inputs $I_1$, $I_2$...$I_{13}$ of buffer 23 illustrated in FIG. 2.

Further, the inputs of AND-gates 28, 29, 30, etc., comprising decoder means 11 (illustrated in FIG. 2), which are connected to inputs $I_1$, $I_2$...$I_{13}$ or complements $\overline{I}_1$, $\overline{I}_2$...$\overline{I}_{13}$ in a scheme whereby only two of the inputs of each AND gate are selectively connected to "I's" while the remaining 11 inputs are connected to "$\overline{I}$'s" as discussed above, is illustrated in FIGS. 4 and 5 for operation in conjunction with the particular keyboard signals embodied in FIG. 3. The interconnection of each input of each of 80 AND gates (78 gates corresponding to the 78 character keys plus two extra gates for various optional features) is represented by an "X" in the chart to either the "I" or "$\overline{I}$" line. As a result, when only the first key of the keyboard is depressed, a logical "1" signal is transmitted only from first AND-gate 28 of decoder means 11 to the gates comprising conversion means 12 as illustrated in FIG. 2. When the second key is depressed, a signal is sent out from second AND-gate 29 and so forth. In the illustrated embodiment, the eightieth AND-gate 32 is connected only to "$\overline{I}$'s" so that a signal is transmitted from gate 32 only when no key is depressed. Seventy-ninth AND-gate 31, an extra gate in this particular embodiment, is connected to all "I's" so that an output is transmitted from that gate only if all keys are depressed, a condition which is unlikely to ever occur.

One feature of decoder means 27 provides a digital (rather than an analog added voltage) error signal when two or more keys are depressed simultaneously, whereby no information is transmitted from the encoder system under such condition. The feature utilizes the effect of the inputs to AND-gates 28, 29, 30, etc., being connected to only two "I's" and eleven "$\overline{I}$'s". When two or more keys are depressed simultaneously, a total of four logical "1's" are transmitted from outputs $K_1$, $K_2K_{13}$ and thereby to $I_1$, $I_2 \ldots I_{13}$. Since AND-gates 28, 29, 30, etc., operate only when two logical "1's" are transmitted, none of the 78 AND gates so connected provide a logical "1" output signal when the error condition occurs and no new information is transmitted. A timing control output T of conversion means 12 senses the no new information condition and the timing generator (not shown in FIG. 2) does not send a timing pulse which would otherwise cause the no new information condition to be stored or transmitted to the peripheral equipment.

Conversion means 12 is comprised of a plurality of OR gates of which six, 34, 35, 36, 37, 38 and 39, are shown. The number of OR gates employed is dependent firstly upon the number of bit positions required or desired for the output signal, secondly upon the number of character keys on the keyboard and lastly upon the number of mode or shift signals utilized. In the particular 78 key embodiment illustrated, a four-mode system with a particular desired output comprising 10 bits of binary character data is described by way of example. Thus, conversion means 12 has a total of 40 OR-gates 34, 35, 36, 37, etc., for converting the signal representative of a single depressed key from decoder means 11 to an expanded binary signal comprising 40 bit positions. Two additional OR-gates 38 and 39 are utilized in conjunction with other features of the invention hereinafter to be described in detail.

For the particular embodiment being described, an example of the interconnections between the inputs of the 40 OR-gates 35, 36, 37, etc., of conversion means 11 and the outputs of the 80 AND-gates 28, 29, 30, 31, 32, etc., are illustrated in FIGS. 6, 7, 8 and 9. An interconnection is represented by an "X" while a noninterconnection is represented by a blank box in the chart. Also represented by these charts are the expanded binary signals formed by conversion means 12 (illustrated in FIG. 2). For example, when the first character key of the keyboard is depressed, a logical "1" signal is transmitted from first AND-gate 28, as illustrated in FIG. 2, to the inputs of selected OR gates of conversion means 12 in accordance with the charts of FIGS. 6, 7, 8 and 9. A logical "1" output thus appears at the outputs of those of the forty OR gates which are connected to the first AND gate. If the "X's" on these charts are taken to be logical "1's" and the blanks are taken to be logical "0's", the expanded binary signal is ascertained. Thus, when the first key "KEY 1" is depressed, the expanded binary signal is {1010010000000000000000000000000100000110}

Referring once again to FIG. 2, gating means 13 is provided for selecting 10 of the 40 bit positions comprising the expanded binary signal, in accordance with the four modes, to achieve the desired binary-coded output signal. Gating means 13 is comprised of a plurality of AND gates of which four, 41, 42, 43 and 44, are shown, each corresponding to one of the bit positions of the expanded binary signal transmitted from conversion means 12. One of two inputs of each of the AND gates is thus connected to the output of one of OR-gates 34, 35, 36 or 37, etc., while the other of the two inputs is selectively connected to one of the mode or shift signals. In the four-mode embodiment being illustrated, the mode signals of each of the four modes are introduced at input terminals $N_1$, $N_2$, $N_3$ and $N_4$, respectively.

Since the embodiment being illustrated has an expanded binary signal of 40 bits, four mode signals and a desired output signal of 10 bits, every fourth AND gate of gating means 13 is connected to the same mode. Each four AND-gates 41, 42, 43 and 44, for example, are connected to an OR-gate 45 to selectively form one bit $O_1$ of the desired 10-bit binary coded output signal $O_1 \ldots O_{10}$.

Two additional output signals are provided by OR-gates 38 and 39 of conversion means 12. The inputs of these OR gates are coupled to each of the 78 AND-gates 28, 29, 30, etc., comprising decoder means 11 or to AND-gate 32 through a NOT-gate so that a signal is normally transmitted from both such OR-gates 38 and 39 when any key is depressed. The output AK of one of these OR-gates 38 becomes the "ANY KEY" signal while the output T of the other Or-gate 39 is utilized as a timing control. A no signal condition is transmitted from output T when the error feature is employed as described above.

As previously discussed with reference to FIG. 1, the mode signals utilized in selecting those bit positions of the expanded binary signal, which are to form the binary-coded output signal, may be provided in several ways. One means providing such mode signals employs three shift signals $S_1$, $S_2$ and $S_3$, transmitted from the keyboard to the encoder system. Means for converting these three shift signals into four mode signals is illustrated in FIG. 10. Shift signals $S_1$, $S_2$ and $S_3$ or "SHIFT 1," "SHIFT 2" and "SHIFT 3," respectively, are introduced into mode input buffer 14. Buffer 14 is comprised of three inverter or NOT-gates 48, 49 and 50 which form the complements $\overline{S}_1$, $\overline{S}_2$ and $\overline{S}_3$ of $S_1$, $S_2$ and $S_3$, respectively. The shift signals and their complements are then transmitted to mode decode means 15 comprised of three or more AND gates. In this particular embodiment of the invention mode decode means 15 is comprised of eight AND-gates 52, 53, 54, 55, 56, 57, 58 and 59. Each of the outputs of these eight AND-gates are then selectively connected to one of four OR-gates 61, 62, 63 or 64 which comprise mode encode means 16. The chart of FIG. 11 illustrates the logical "1" mode signals $M_1$, $M_2$, $M_3$ and $M_4$ or "MODE 1," "MODE 2," "MODE 3" and "MODE 4," respectively, (represented by "X's" on the chart) achieved when combinations of shift signals are received. When a logical "1" $S_1$ signal is received, and $S_2$ and $S_3$ are both logical "0's," for example, a logical "1" signal is transmitted on $M_2$. Similarly, a logical "1" signal is transmitted on $M_3$ when a logical "1" $S_2$ signal is received, on $M_4$ when a logical "1" $S_3$ signal is received, and on $M_1$ when both $S_1$ and $S_2$ signals are received. Other combinations are available to achieve the same mode signals as indicated on the chart.

The conversion means of FIG. 10, as described above, is then included as part of gating means 13 shown in FIG. 2. Mode signals $M_1$, $M_2$, $M_3$ and $M_4$ are introduced at $N_1$, $N_2$, $N_3$ and $N_4$, respectively, whereby the bit positions of the expanded binary signal are selected to form the 10 bit binary-coded output signal $O_1 \ldots O_{10}$ in accordance with such mode signals.

The desired 10 bit binary-coded output signal $O_1 \ldots O_{10}$ of the illustrated embodiment of the encoder system is illustrated in FIGS. 12, 13, 14 and 15 for each of Modes $M_1$, $M_2$, $M_3$ and $M_4$, respectively. For example, if the first key "KEY 1" is depressed and a logic "1" shift signal is transmitted only to $S_1$, the following occurs. According to the chart of FIG. 11, the logic circuit of FIG. 10 places the encoder system in "MODE 2" operation. An $M_2$ signal is thus transmitted from the circuit of FIG. 10 to the $N_2$ input of the circuit of FIG. 2. The first key being depressed, logic "1" signals are transmitted from the keyboard on two of the 13 output lines or channels $K_1$, $K_2 \ldots K_{13}$. In particular, the chart of FIG. 3 indicates that when "KEY 1" is depressed logic "1" signals are transmitted on lines $K_1$ and $K_2$. These signals are transmitted to inputs $I_1$ and $I_2$, respectively, of input buffer 10 illustrated in the logic circuit of FIG. 2 whereby the signal is reformed as $\{I_1, \overline{I}_2, \overline{I}_3, \overline{I}_4, \overline{I}_5, \overline{I}_6, \overline{I}_7, \overline{I}_8, \overline{I}_9, \overline{I}_{10}, \overline{I}_{11}, \overline{I}_{12}, \overline{I}_{13}\}$. The reformed signal is then transmitted to decoder means 11 where it is decoded into one separate signal representing a single depressed key. Particularly, with reference to the chart of FIG. 4 it is ascertained that when such reformed signal is transmitted to the AND gates of the decoder means a signal is transmitted only from the output of the first AND gate. Conversion means 12 of the logic circuit of FIG. 2 converts the signal from first AND-gate 28 to an expanded binary signal having 40 bit positions. The chart of FIGS. 6, 7, 8 and 9 indicate that such expanded binary signal is {1010010000000000000000000000000010000110}. Gating means 13 selects 10 of the 40 bits, in accordance with the mode signal, to provide the desired binary-coded output signal. Since the encoder system is in "MODE 2" operation, a logic "1" signal is transmitted from $N_2$ to every fourth AND gate comprising gating means 13 beginning with second gate 42. Hence, every fourth bit position is selected to form the desired binary-coded output signal, which in this instance is {0100000001}. This output signal is shown in the chart of FIG. 13.

Similarly, when the mode of operation remains AS "MODE 1" and "KEY 49" is depressed (a space bar, for example), the 10-bit binary-coded output signal of the encoder system, as indicated by the chart of FIG. 13, is {0111111001}. When the same key ("KEY 49") is depressed but the mode of operation is "MODE 3," as occurs when a logic "1" shift signal is transmitted only to $S_2$, the binary-coded output signal is then {1111111001}, as indicated by the chart of FIG. 14.

Figure 16:
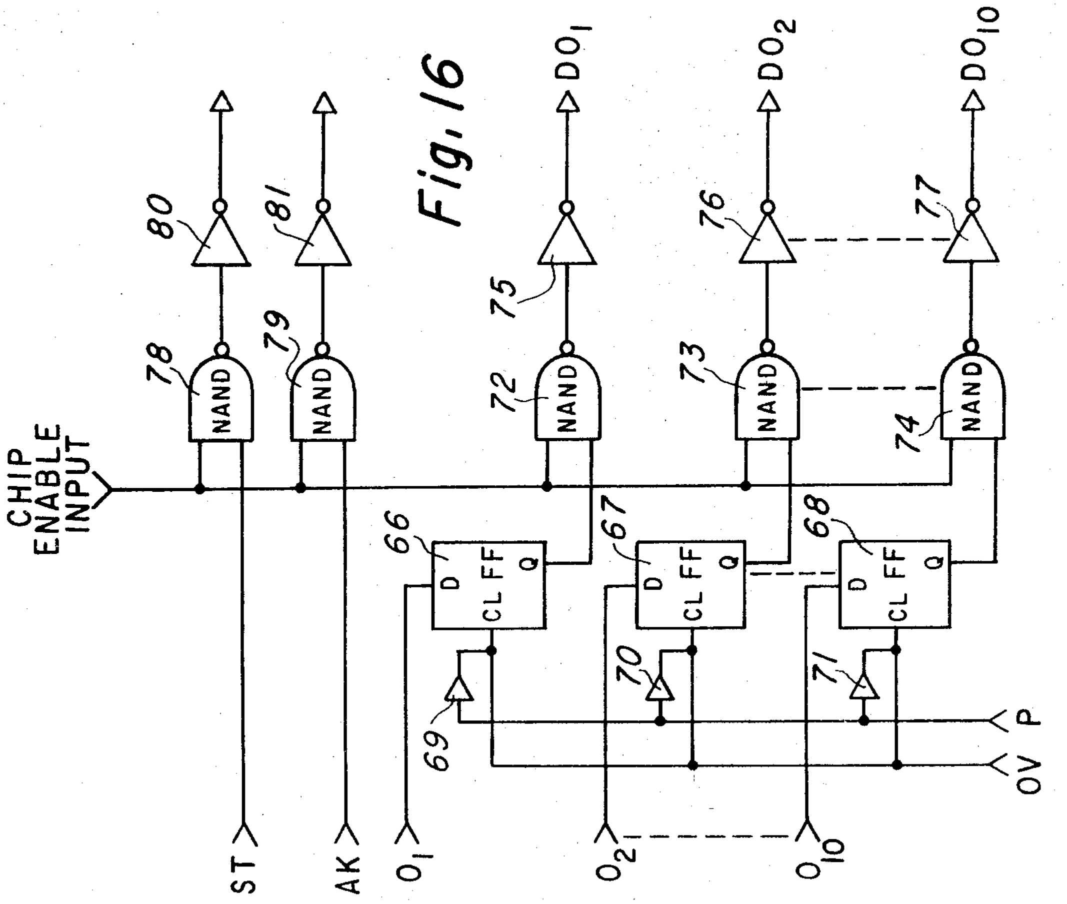
FIG. 16 illustrates means for storing the binary-coded output signals employed in an embodiment of the system of the invention.

One embodiment of the invention, as previously discussed with reference to FIG. 1, includes means 17 for temporarily storing the binary-coded output signal. Essentially, storage means 17 is comprised of a plurality of flip-flops of which three 66, 67 and 68 are shown in FIG. 16. The number of such flip-flops is determined by the number of bit positions comprising the desired binary-coded output signal as each flip-flop stores one bit of binary information. Thus, in the illustrated embodiment having a 10-bit output signal, 10 flip-flops are utilized for such purpose and output signals $O_1, O_2 \ldots O_{10}$ are introduced into the inputs of flip-flops 66, 67 to 68, respectively. The flip-flops are clocked or operated to temporarily store the binary-coded output signal when a pulse is transmitted to input P which, in turn, transmits the pulse to the clock input "CL" of each flip-flop 66, 67, 68, etc. The clock inputs "CL" are coupled to the P input line through amplifiers 69, 70, 71, etc., to assure enough pulse current to flip all 10 flip-flops at once. An override terminal OV is provided in one embodiment of the encoder system to allow continuous transmission of the binary-coded output signal from the encoder system to the peripheral equipment without utilizing the temporary storage feature. A current at OV operates the storage means in a continuous flow of information operating condition. NAND-gates 72, 73, 74, etc., and inverter-amplifier gates 75, 76, 77, etc., provide means for buffering and amplifying the binary-coded character data output signal prior to transmitting such signal to peripheral equipment over lines or channels $DO_1, DO_2 \ldots DO_{10}$.

A feature of the particular embodiment of the invention illustrated in FIGS. 1 and 16 prevents information from being transmitted to peripheral equipment even though the information stored in flip-flops 66, 67, 68, etc., is changing. This condition occurs when a continuous current is removed from the "CHIP ENABLE INPUT" coupled to each NAND-gate of the output buffer including gates 72, 73, 74, etc., of the 10-character data output channels $DO_1, DO_2 \ldots DO_{10}$. In addition, the "STROBE" signal previously discussed is introduced at terminal ST and the "ANY KEY" signal, also previously discussed, is introduced at terminal AK, both to be transmitted to the peripheral equipment when such features are desired. As with the character data output buffer described above, NAND-gates 78 and 79 and inverter-amplifier gates 80 and 81 are employed to buffer and amplify the "ANY KEY" and "STROBE" signals prior to their transmission.

Figure 17:
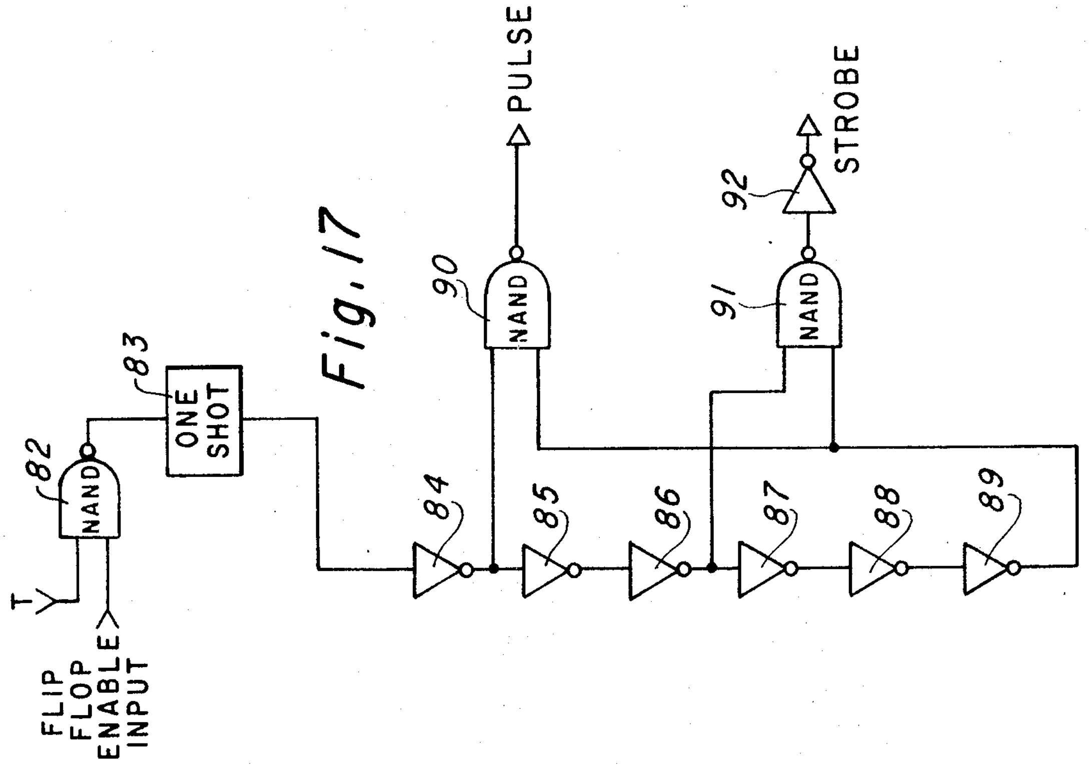
FIG. 17 illustrates a timing circuit employed in an embodiment of the system of the invention.

FIG. 17 illustrates an embodiment of timing generator means for providing the pulses comprising the clock signal for the operation of the flip-flops of FIG. 16 and the "STROBE" signal. Essentially, the timing generator is comprised of NAND-gate 82 and one-shot multivibrator 83. Considering a constant current being transmitted to the "FLIP-FLOP ENABLE INPUT", a logical "1" signal transmitted to input T produces a one-shot pulse at the output of multivibrator 83. A series of inverter-amplifier gates 84, 85, 86, 87, 88 and 89 both delay and amplify the pulse which is then transmitted through NAND-gates 90 and 91 and inverter-gate 92 to produce the time or enter "PULSE" for operation of the flip-flops and the "STROBE" signal as shown. The purpose of the pulse delay is to allow the logic gates comprising the decode means, encode means or data array, gating means or mode selector, mode decode means, and mode encode means to transfer their respective logic signals before a pulse is transmitted to trigger the flip-flops since the same keyboard signal begins both the logic gating and the generation of a new timing pulse. The "STROBE" pulse, as generated, is further delayed as additional time is required between the instant a new output signal is clocked into the flip-flops and the instant that the flip-flops have been stabilized to that new output signal so the peripheral equipment can use the new information as stored.

The "FLIP-FLOP ENABLE INPUT" comprises another feature of the system embodied in FIG. 17. Its operation is similar to that of the "CHIP ENABLE INPUT"; however, not only does it prevent information from being transmitted to peripheral equipment, but it also prevents information from being stored in the flip-flops comprising the temporary storage means of FIG. 16. This condition occurs when a continuous current or logic "1" signal is removed from such input to NAND-gate 82 whereby no signal is transmitted to one-shot multivibrator 83, even if a logic "1" signal is transmitted to the T input of gate 82. Both the "CHIP ENABLE INPUT" feature and the "FLIP-FLOP ENABLE INPUT" together allow complete flexible control of the transmission of character data from the keyboard to the peripheral equipment.

The description of specific embodiments of the encoder system contained herein is merely illustrative of the principles underlying the inventive concept of such system. Without departing from the spirit and scope of the invention, various modifications of the disclosed embodiments, as well as other embodiments of the invention, will be apparent to persons skilled in the art.

What is claimed is:

1. In a digital keyboard information transmission system having a keyboard of character keys and one or more shift keys, each of said character keys generating two data signals and said one or more shift keys generating at least two shift signals, means for providing information in binary machine language to an electronic system which comprises:
   a. means for decoding the two data output signals from said character keys into separate signals representing a single depressed key:
   b. means for converting said separate signals into an expanded binary signal having a plurality of bit positions of a predetermined length; and
   c. means for selectively gating said expanded binary signal in accordance with said shift signals to selectively provide a binary-coded output signal comprising a smaller number of bit positions than said expanded signal of predetermined length.

2. The keyboard system of claim 1 including digital means for developing an error signal when two or more of said character keys are depressed simultaneously whereby no information is transmitted from the encoder system.

3. The keyboard system of claim 1 wherein said gating means is comprised of:
   a. means for decoding the shift signals into binary combinations of a predetermined length;
   b. means for encoding the binary combination into three or more modes; and
   c. means for selecting one or more of said plurality of bit positions in accordance with said modes to provide said binary-coded output signals having a total number of bit positions less than said predetermined length.

4. The keyboard system of claim 1 including means for temporarily storing said binary-coded output signal only until a subsequent binary-coded output signal is impressed upon said temporary storage means.

5. The keyboard system of claim 4 including means for operating said storage means coupled to said conversion means whereby a new binary-coded output signal is stored each time a character key is depressed.

6. The keyboard system of claim 5 including digital means for transmitting an error signal to said operating means whereby no new binary-coded output signal is stored when two or more character keys are depressed simultaneously.

7. The keyboard system of claim 4 including an output buffer coupled to said storage means for transmitting the binary-coded output signal to peripheral equipment.

8. The keyboard system of claim 7 including means for transmitting an any key signal to peripheral equipment if any character key is depressed, said any key signal transmission means being coupled to said conversion means.

9. The keyboard system of claim 7 including means for transmitting a strobe signal to peripheral equipment, said strobe signal being provided by said operating means whereby said peripheral equipment is synchronized with said operating means.

10. The keyboard system of claim 2 wherein said means for developing an error signal includes coupling means selectively interconnecting said data output signals to said decoding means.

11. The keyboard system of claim 4 wherein said storage means is comprised of a plurality of clocked flip-flops for storing said signal only until a new signal is impressed upon said plurality of flip-flops.

12. The keyboard system of claim 5 wherein said operating means is comprised of a one-shot multivibrator, the input of which is coupled to said conversion means and the output of which is coupled to said storage means.

13. The keyboard system of claim 7 wherein said output buffer is comprised of a plurality of AND gates coupled to said storage means.

14. The keyboard system of claim 7 wherein said output buffer is comprised of:

a. a plurality of inverters, and
b. a plurality of NAND gates, an input of each of which is coupled to said storage means and the output of each of which is coupled to one of said inverters.

15. The keyboard system of claim 12 wherein said strobe signal transmission means is comprised of signal delay means coupled to an output of said operating means.

16. In a digital keyboard information transmission system wherein each character key of said keyboard provides only two data signals, and a shift key provides at least two shift signals, an encoder system comprised of:

a. means for decoding the data output signals from said character keys into separate signals representing a single depressed key, comprised of a first plurality of AND gates;
b. means for converting the separate signals into an expanded binary signal having a plurality of bit positions, comprised of a plurality of OR gates selectively coupled to said first plurality of AND gates; and
c. means for gating said expanded binary signal in accordance with the shift signals to provide binary-coded output signals having a reduced number of bit positions, comprised of a second plurality of AND gates coupled to said plurality of OR gates, including means for selectively applying said shift signals to said second plurality of AND gates to provide said binary-coded output signals.

17. In a digital keyboard information transmission system wherein each character key of said keyboard provides only two data signals and a shift key provides at least two shift signals, an encoder system comprised of:

a. decoder means for decoding the data output signals from said character keys into separate signals representing a single depressed key;
b. means for converting said separate signals into an expanded binary signal having a plurality of bit positions;
c. second decoder means for decoding the shift signals into binary combinations comprised of a first plurality of AND gates;
d. means for encoding the binary combination into three or more mode signals comprised of a plurality of OR gates selectively coupled to said shift signal decoding means; and
e. means for selecting one or more of said plurality of bit positions in accordance with said mode signals to gate said expanded binary-coded output signal, said means comprised of a second plurality of AND gates selectively coupled to said plurality of OR gates and to said conversion means to provide said binary-coded output signal comprising a smaller number of bit positions.

18. In a digital keyboard information transmission system wherein each character key of said keyboard provides only two data signals and a shift key provides at least two shift signals, an encoder system comprised of:

a. means for decoding the data output signals from said character keys into separate signals representing a single depressed key;
b. means for converting said separate signals into an expanded binary signal having a plurality of bit positions;
c. means for selectively gating said expanded binary signal in accordance with said shift signals to provide a binary-coded output signal having a reduced number of bit positions;
d. means for storing said binary-coded output signal; and
e. means for operating said storage means coupled to said conversion means whereby a new binary-coded output signal is stored each time a character key is depressed, comprising a one-shot multivibrator, the input of which is coupled to said conversion means and the output of which is coupled to said storage means;
f. an AND gate to couple said conversion means to said multivibrator; and
g. means for developing an error signal when two or more of said character keys are depressed simultaneously, coupled to one input of said AND gate.

19. In a digital keyboard information transmission system wherein each character key of said keyboard provides only two data signals and a shift key provides at least two shift signals, an encoder system comprised of:

a. means for decoding the data output signals from each of said character keys into separate signals representing a single depressed key;
b. means for converting said separate signals into an expanded binary signal having a plurality of bit positions;
c. means for selectively gating said expanded binary signal in accordance with said shift signals to provide a binary-coded output signal having a reduced number of bit positions;
d. means for storing said binary-coded output signal;
e. means for operating said storage means coupled to said conversion means whereby a new binary-coded output signal is stored each time a character key is depressed, comprising a free-running multivibrator; and
f. an AND gate, the output of which is coupled to said storage means and one input of which is coupled to said multivibrator and another input of which is coupled to said conversion means.

20. The keyboard system of claim 19 including means for developing an error signal when two or more of said character keys are depressed simultaneously, coupled to still another input of said AND gate.

21. In a keyboard information transmission system having a keyboard of character keys and one or more shift keys, each of said character keys generating a unique data signal in a first coded format having a preselected number of bit positions, with two of said bit positions of one state and the remaining bit positions of the other state, and said shift keys generating two or more shift signals, and said system further having encoder means coupled to said keyboard for generating output signals in a second coded format having a predetermined number of bit positions comprising:

a. first logic gate means for decoding said signals of first coded format into a third coded format uniquely representing activation of one character key;
b. second logic gate means coupled to said first logic gate means for decoding signals in said third coded format into a fourth coded format having a reduced number of bit positions less than said third coded format; and
c. third logic gate means coupled to the second logic gate means and responsive to said shift signals to selectively generate said output signals in the second coded format of a predetermined number of bit positions.

22. The keyboard system of claim 21 wherein said third coded format comprises a plurality of bit positions with one bit in one logic state and the other bits in the other logic state.

23. The keyboard system of claim 21 wherein said predetermined number of bit positions is less than said reduced number of bit positions.

24. The keyboard system of claim 21 wherein:

a. said first logic gate means comprises a first plurality of AND gates responsive to signals in said first coded format;
b. said second logic gate means comprises a plurality of OR gates coupled to said first plurality of AND gates and responsive to signals in said third coded format; and
c. said third logic gate means comprises a second plurality of AND gates coupled to said OR gates and responsive to said shift signals.

25. The keyboard system of claim 23 wherein said third logic gate means further comprises:

a. fourth logic gate means for decoding said shift signals into a fourth coded format; and
b. fifth logic gate means coupling said fourth logic gate means to said third gate means for selectively decoding the signals in said fourth format into three or more modes; and
c. sixth logic gate means for selecting from fourth coded format a plurality of bit positions in accordance with said modes to provide said output signals.

26. The keyboard system of claim 21 including:

a. means for temporarily storing said output signal, comprised of a plurality of clocked flip-flops; and
b. means for operating said temporary storage means coupled to said second logic gate means whereby output signals in said second coded format are stored each time a character key is depressed.

27. The keyboard system of claim 26 wherein said operating means is comprised of:

a. a free running multivibrator, and
b. an AND gate, the output of which is coupled to said storage means and one input of which is coupled to said multivibrator and another input of which is coupled to said conversion means.

28. The keyboard system of claim 27 including means for developing an error signal when two or more of said character keys are depressed simultaneously coupled to still another input of said AND gate.

29. A keyboard information transmission system for generating first signals in a first coded format and decoding said first signals into a second coded format having a predetermined number of bit positions, comprising:

a. a keyboard having character keys and one or more shift keys, each of said character keys operable to generate a unique data signal in said first coded format having a preselected number of bit positions with two of said bit positions of one state and the remaining bit positions of another state, and said one or more shift keys generating two or more shift signals;
b. first logic gate means for decoding signals of said first coded format into a third coded format uniquely representing activation of one character key;
c. second logic gate means coupled to said first logic gate means for decoding signals in said third format into a fourth coded format having a reduced number of bit positions less than said third coded format; and
d. third logic gate means coupled to the second logic gate means and responsive to said shift signals for selectively generating said output signals in the second coded format of a predetermined number of bit positions, said predetermined number being smaller than said reduced number.

30. The keyboard information transmission system of claim 29 wherein said character keys and said shift keys are of the contactless type.

31. The keyboard system of claim 25 wherein:

a. said fourth logic gate means comprises a third plurality of AND gates;
b. said fifth logic gate means comprises a second plurality of OR gates coupled to said third plurality; and
c. said sixth logic gate means comprises a fourth plurality of AND gates coupled to said second plurality of OR gates.

* * * * *